Jan. 3, 1967  R. L. MILLER ETAL  3,295,439
PRINTING APPARATUS

Filed March 10, 1964  7 Sheets-Sheet 1

INVENTORS
Robert L. Miller, Ernest C. Webb
Stephen C. Peplin and Vernon C. Becks
BY
ATTORNEY

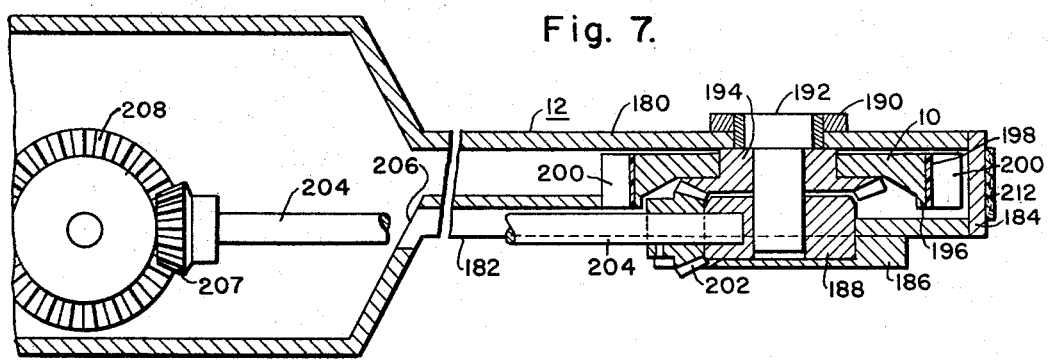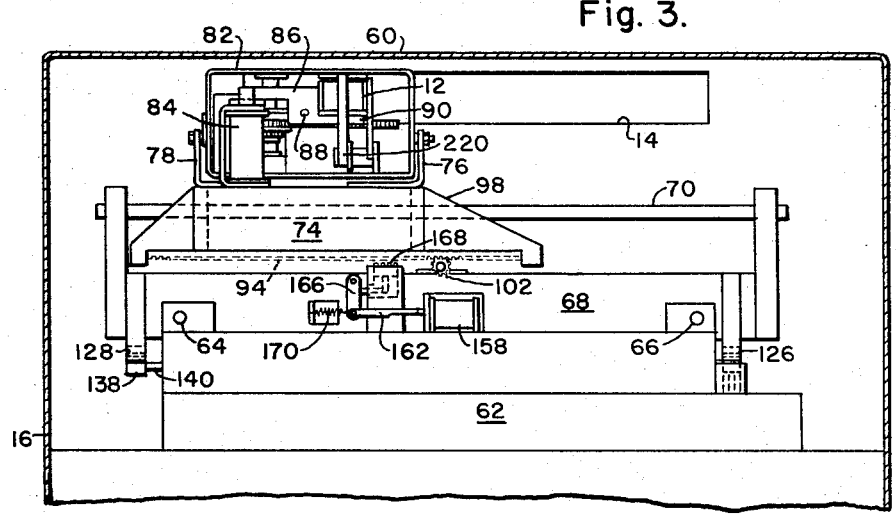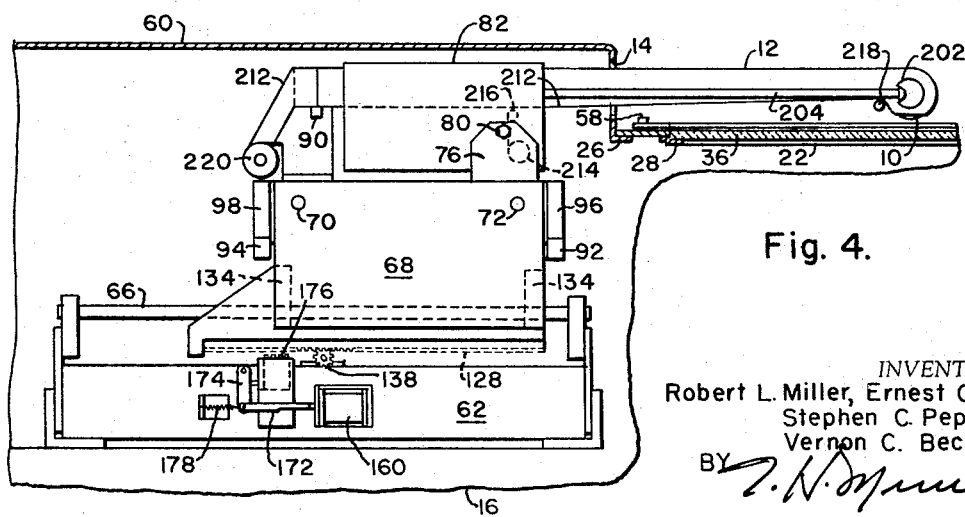

Jan. 3, 1967   R. L. MILLER ET AL   3,295,439
PRINTING APPARATUS

Filed March 10, 1964   7 Sheets-Sheet 3

INVENTORS
Robert L. Miller, Ernest C. Webb,
Stephen C. Peplin and Vernon C. Becks

ATTORNEY

Jan. 3, 1967  R. L. MILLER ETAL  3,295,439
PRINTING APPARATUS
Filed March 10, 1964  7 Sheets-Sheet 4
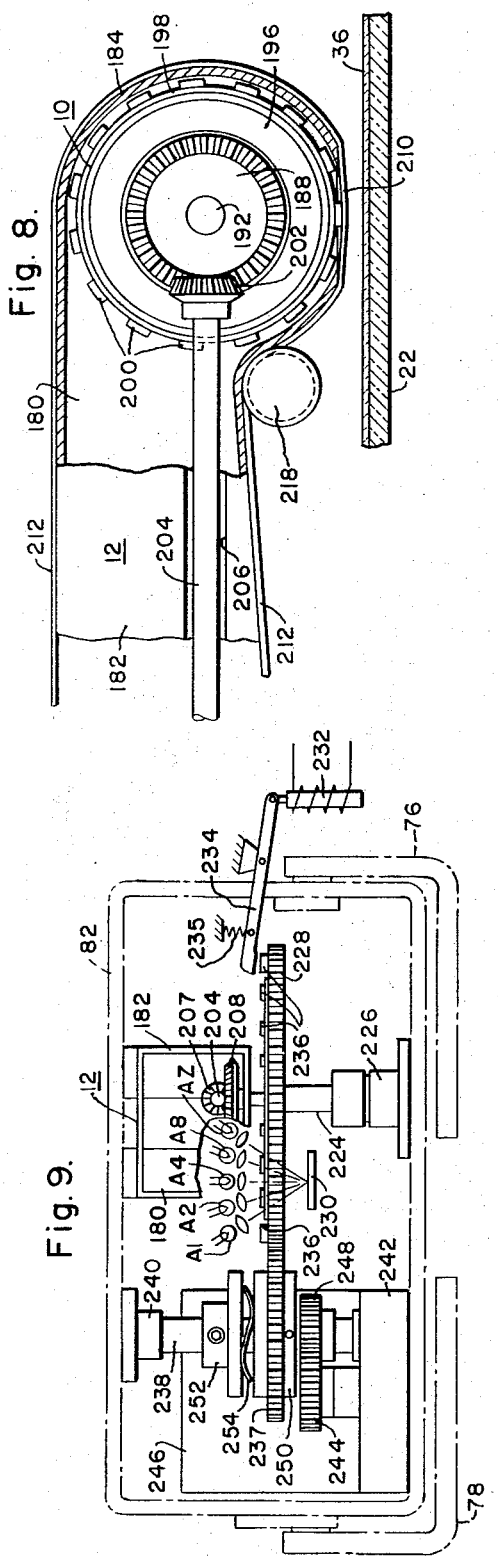
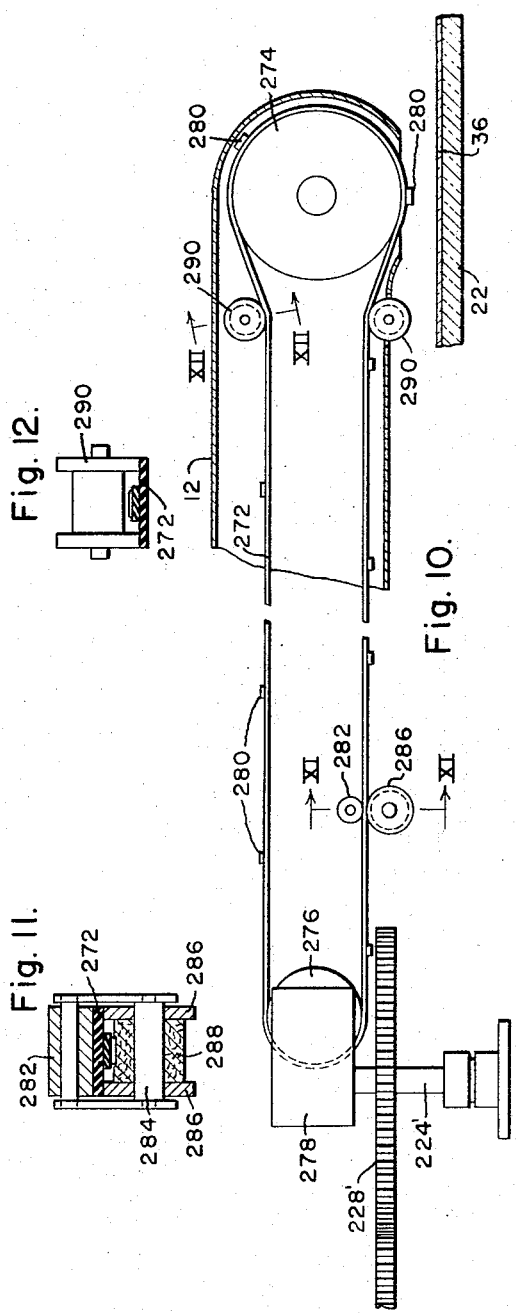
INVENTORS
Robert L. Miller, Ernest C. Webb
Stephen C. Peplin and Vernon C. Becks
BY
ATTORNEY Jan. 3, 1967   R. L. MILLER ET AL   3,295,439
PRINTING APPARATUS Filed March 10, 1964   7 Sheets-Sheet 5

INVENTORS
Robert L. Miller, Ernest C. Webb,
Stephen C. Peplin and Vernon C. Becks
BY

ATTORNEY

INVENTORS
Robert L. Miller, Ernest C. Webb
Stephen C. Peplin and Vernon C. Becks

ATTORNEY

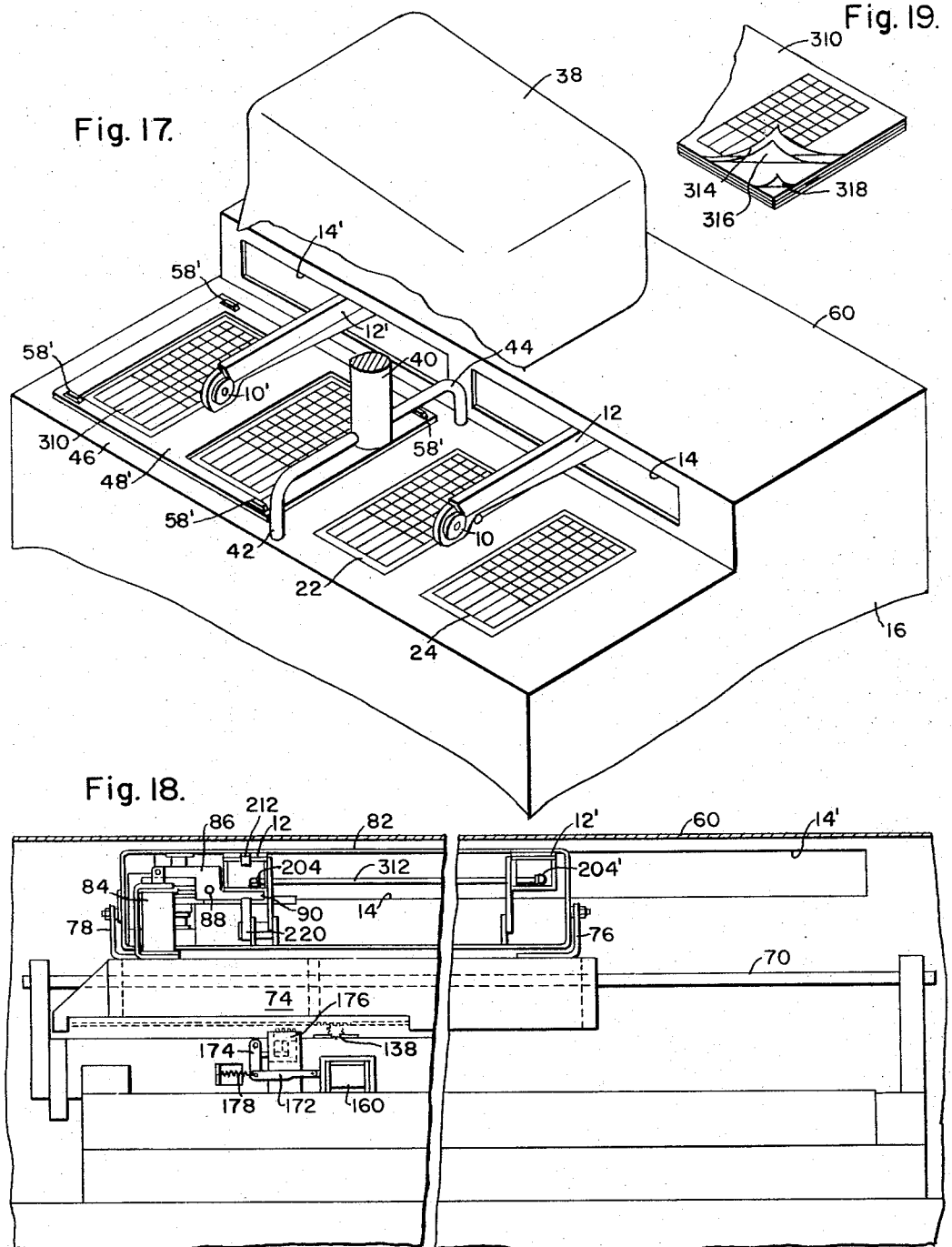

3,295,439
PRINTING APPARATUS
Robert L. Miller, Olmsted Falls, Ernest C. Webb, Bay Village, Stephen C. Peplin, North Olmsted, and Vernon C. Becks, Westlake, Ohio, assignors to Cleveland Trust Company, Cleveland, Ohio, trustee
Filed Mar. 10, 1964, Ser. No. 350,738
19 Claims. (Cl. 101—93)

This invention relates to apparatus for printing on a sheet of material so as to maintain substantially the entire sheet visible during a printing operation. More particularly, the invention relates to apparatus of the type described particularly useful in printing ball results and scores on a bowling game score sheet.

Although not limited thereto, the present invention is particularly adapted for use with a system for automatically detecting, totalizing and printing ball results and scores on a bowling game score sheet. Such a system is shown, for example, in U.S. Patent No. 3,124,355, issued to Everett K. Mentzer et al. on March 10, 1964. In any system of this sort, it is essential to maintain substantially the entire score sheet visible during the progress of a game. Bowlers are, of course, normally accustomed to viewing the entire score sheet during the game, and any printing arrangement which obscures a major portion of the score sheet might discourage use of the equipment. At the same time, it is usually necessary to provide each bowler with a permanent copy of the score sheet at the completion of a game. Finally, in many cases, it is desirable to project the score sheet onto a screen or the like during the progress of a game. For this purpose, best results can be obtained by employing transparent projection techniques wherein light shines through, rather than being reflected from, the score sheet form.

The provision of apparatus for effecting all of the foregoing desirable characteristics in a score printing system is not a simple matter, particularly when it is remembered that the cost of the equipment must be maintained reasonable if it is to find widespread use in bowling alleys. Conventional printing apparatus normally obstructs a portion of the sheet which is printed and is, therefore, not satisfactory where it is desirable to maintain substantially the entire sheet visible during the game. Also, the necessity for multiple copies of the score sheet at the completion of the game, coupled with projection of the score, raises problems the solution to which cannot be found by reference to prior art printing and projection systems.

Accordingly, as an overall object, the present invention seeks to provide appartaus for printing on a sheet of material such that the sheet is substantially unobstructed during the printing operation.

More specifically, an object of the invention is to provide apparatus for automatically printing ball results and scores on a bowling game score sheet in a manner such that substantially the entire sheet is visible along with the ball results and frame-to-frame scores of all players achieved during the progress of a game. In this way, the system closely approximates the present manual system of entering scores wherein the entire sheet is visible except when the scorekeeper's hand obstructs a portion of the sheet during the time that an entry is made.

Still another object of the invention is to provide apparatus for automatically printing ball results and scores on a bowling game score sheet which facilitates projection of a substantially continuous image of the score sheet onto a screen or the like.

Finally, an important object of the invention is to provide apparatus of the type described which is relatively simple in construction so as to be manufactured at a cost which will enable its use on a wide scale.

In accordance with the invention, the score sheet or other material to be printed is supported on a platen and the printing mechanism proper disposed at the side of the platen and score sheet. Such printing mechanism includes a first carriage movable along the player lines of the score sheet and a second carriage movable on the first carriage along the frame columns of the score sheet. Supported on the second carriage is a cantilever arm which extends outwardly over the platen and score sheet such that only the cantilever arm can ever obstruct any portion of the score sheet. On the end of the cantilever arm is a printing element which, in one embodiment of the invention, comprises a single printing wheel having type characters spaced around its periphery and rotatable about an axis extending transverse to the axis of the cantilever arm. As will be seen, this arrangement provides a very narrow cantilever arm member which, at most, obstructs only a minor portion of the score sheet during an actual printing operation and which can be moved out of the field of view of the score sheet at all other times. The printing wheel is driven by means of a shaft and bevel gear arrangement interconnecting the printing wheel with the drive and control mechanism on the aforesaid second carriage.

As an alternative to the printing wheel, a further reduction in the width of the cantilever arm can be achieved by employing a continuous band having spaced type characters thereon and movable around the periphery of the cantilever arm whereby successive printing characters on the band may be moved into position for printing. In either case, regardless of whether a band or printing wheel is employed, the cantilever arm is pivoted downwardly toward the score sheet during a printing operation to thereby press a selected one of the type characters against the score sheet. Preferably, a carbon tape or the like is passed beneath the type character to be pressed against the score sheet; however, the type characters on the printing element may be inked by means of an inking roller or the like if desired. The control mechanism for the carriages on which the cantilever arm is mounted is such as to move the printing element of the cantilever arm over any selected results box on the score sheet or over any selected score box.

During a results printing operation, only a single type impression is required; however since only one printing element is employed in accordance with the invention, it is necessary, in order to print scores, to move the cantilever arm through as many as three steps in printing units, tens and hundreds in the score. In this respect, the invention provides novel control means for the carriages on which the cantilever arm is mounted whereby the arm can be positioned in any results or score box on either one of two score sheets and in as many as three different places within a selected score box on either sheet.

Where is is desired to project the scores onto a screen, the score sheet may be formed from material through which light will pass and is supported on a transparent platen such that light shining through the platen and score sheet may be focused through a lens system onto a screen. The score sheet in this case is preferably formed from nonabsorbing material such as acetate, the ink used being such that it will remain moist after the printing operation. In this way, the scores printed on the nonabsorbing score sheet may be transferred to an absorbing sheet of translucent material by pressing the two together, and the scores thereafter wiped off the transparent non-absorbing sheet used in the projection process such that it can be used for subsequent games. Another method for transferring the scores on the transparent score sheet to a permanent record is by means of any of the well known photographic or the like copying techniques.

As an alternative to the foregoing, and in accordance with another important aspect of the invention, multiple copies of permanent records of the score sheet can be produced during the game and while the scores are being projected, thereby eliminating the need for a subsequent time-consuming duplicating process. In this latter case, the scores are printed directly on the transparent platen which acts, in effect, as the score sheet itself. A second cantilever arm, coupled or slaved to the first so as to duplicate its motion, is utilized to print permanent score sheet copies at a location removed from the transparent platen where the permanent printing process does not interfere with projection of the frame-to-frame ball results and scores.

The above and other objects and features of the invention will become apparent from the following detailed description taken in connection with the accompanying drawings which form a part of this specification, and in which:

FIGURE 1 is a perspective view of a console housing the printing apparatus of the invention and showing the arrangement for projecting the printed scores onto a screen or the like;

FIG. 3 is an elevational rear view of the printing apparatus of the invention as seen from the side thereof opposite the score sheet;

FIG. 4 is an elevational side view of the printing apparatus of the invention;

FIG. 7 is a cross-sectional view taken substantially along line VII—VII of FIG. 4 showing the single printing wheel of the invention;

FIG. 8 is a broken-away side view of the printing wheel shown in FIG. 7;

Figure 13:
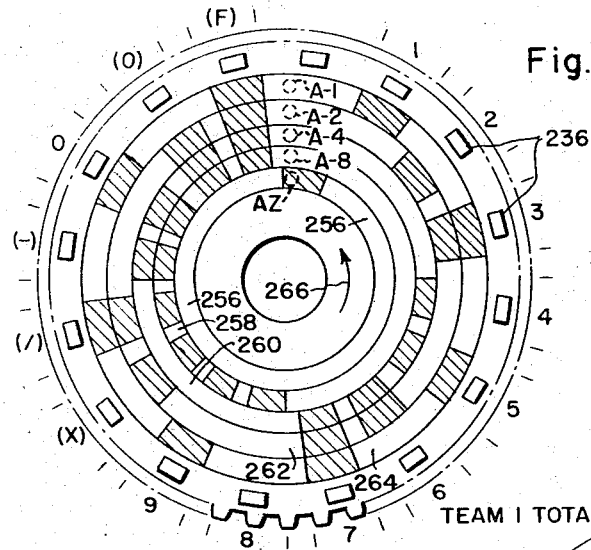
Figure 14:
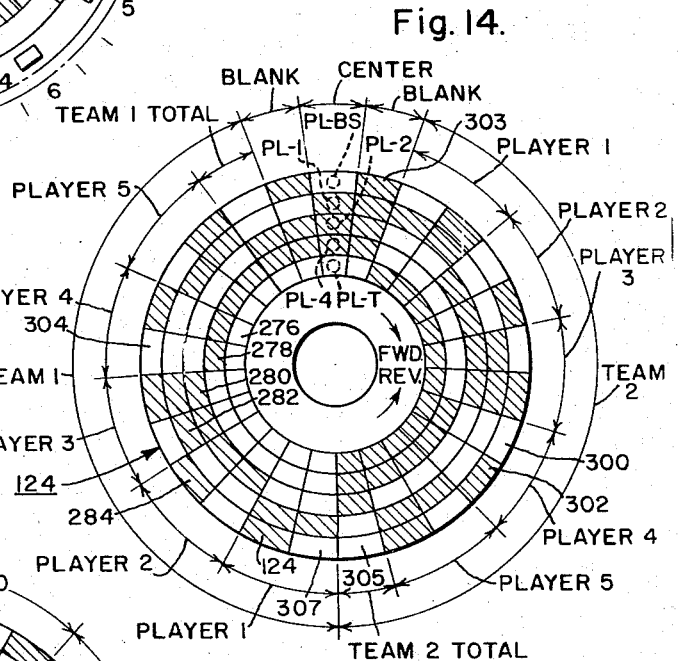
Figure 15:
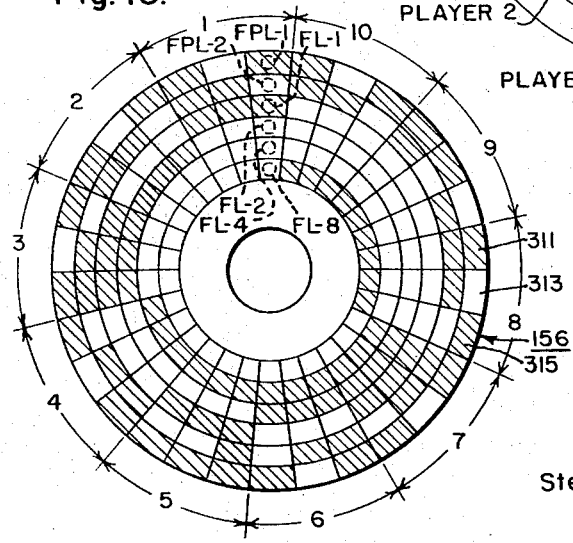
Figure 16:
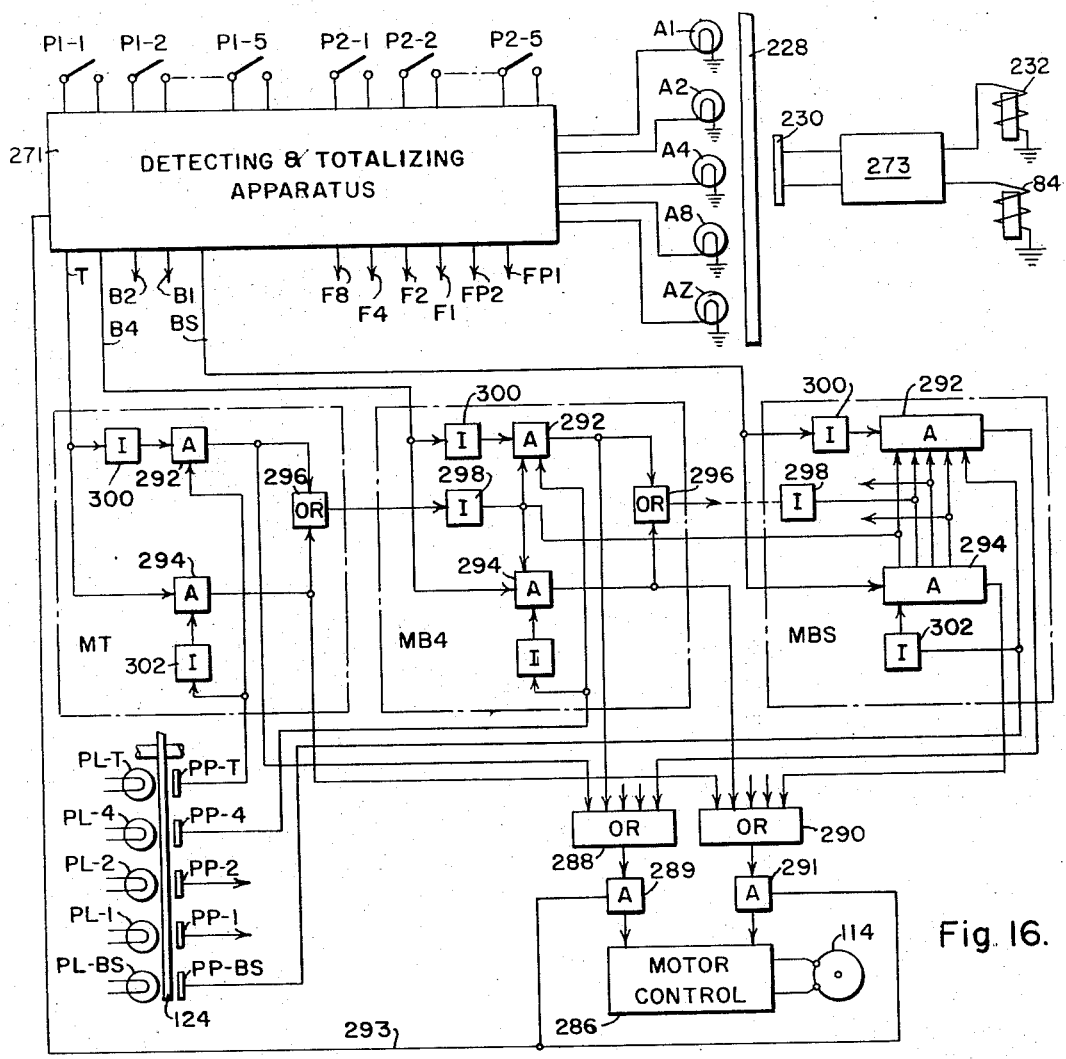
Figure 20:
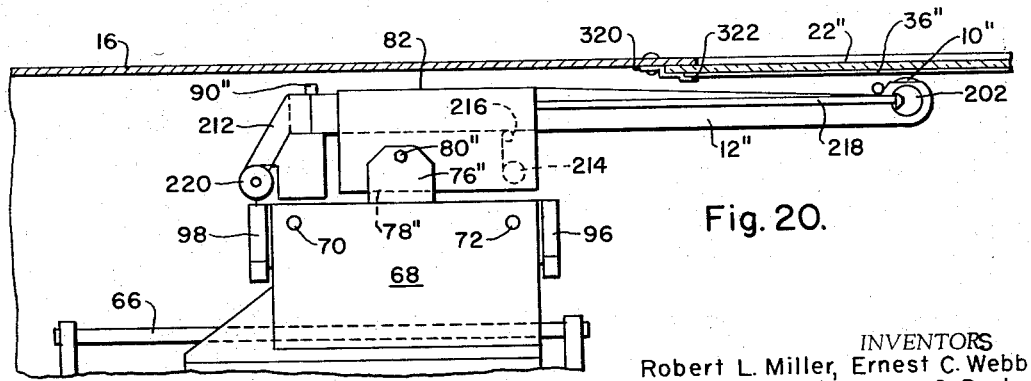

FIG. 9 schematically illustrates the drive system for the single printing wheel shown in FIGS. 7 and 8;

FIG. 10 is a schematic illustration of another embodiment of the invention wherein the single printing wheel is replaced by a single continuous band having type characters spaced along its length;

FIG. 11 is a cross-sectional view taken along line XI—XI of FIG. 10;

FIG. 12 is a cross-sectional view taken along line XII—XII of FIG. 10;

FIGS. 13, 14 and 15 illustrate code wheels used in controlling the printing apparatus of the invention;

FIG. 16 is a schematic circuit diagram of the control circuitry for the printing apparatus of the invention;

FIG. 17 is a perspective view of another embodiment of the invention utilizing two printing wheels mounted on cantilever arms and operable in synchronism, one printing wheel being for projected scores and the other being for permanent scores;

FIG. 18 is a view, similar to FIG. 3, comprising an elevational rear view of the printing apparatus of FIG. 17;

FIG. 19 is an illustration of the permanent score sheet form used in the embodiment of FIG. 17; and FIG. 20 illustrates still a further alternate embodiment of the invention wherein a transparent score sheet is printed on its underside for projection purposes.

Figure 1:
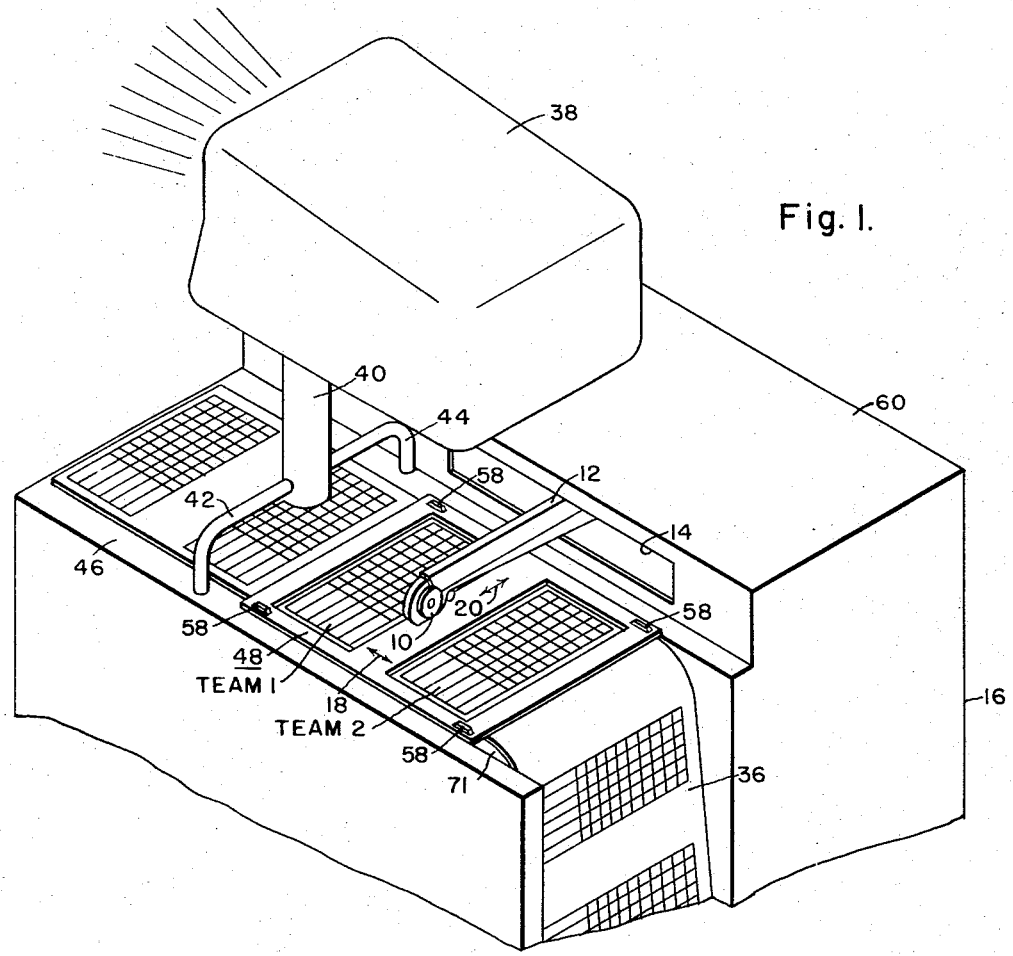
Figure 2:
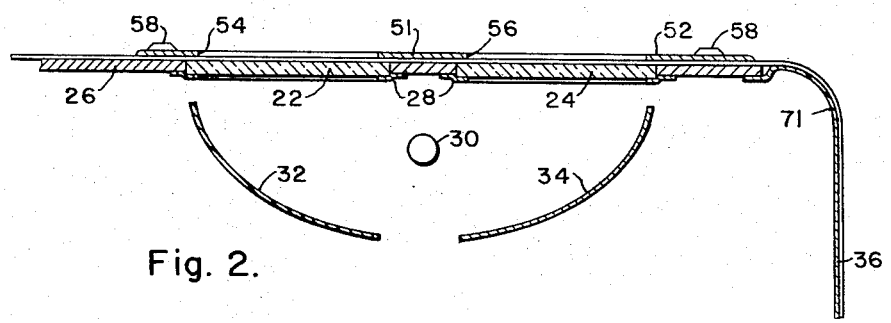
FIG. 2 is a cross-sectional view of the score sheet and transparent platen arrangement of the console of FIG. 1.

Referring now to the drawings, and particularly to FIGS. 1 and 2, the score printing apparatus shown therein includes a single printing wheel, generally indicated by the reference numeral 10, and mounted on a cantilever arm 12 which projects outwardly through a slot 14 in a console 16. The console 16 is normally positioned between two adjacent bowling alleys; and in this respect the score printing apparatus shown is adapted to print the ball results and scores on two score sheets for two teams in league play wherein the teams exchange alleys during successive frames of the game. Alternatively, the two score sheets could be used in open bowling wherein the bowlers on one alley bowl independently of those on the other. The printing mechanism proper within the console 16, hereinafter described in detail, is adapted to move the cantilever arm 12 and the single printing wheel 10 carried thereon in quadrature. That is, it can move in one direction along the arrow 18 shown in FIG. 1 and in another direction at right angles thereto along the direction of arrow 20. In this manner, the printing wheel 10 can be positioned over any point on either one of the two blank score sheet forms.

Beneath the single printing wheel 10 are two transparent plates or platens 22 and 24 (FIG. 2) each of which is adapted to support a transparent, nonabsorbing score sheet form. The necessity for two transparent plates 22 and 24 and two score sheet forms will be apparent when it is remembered that in league play, two teams bowl on adjacent bowling alleys. Consequently, one score sheet form is required for each team and the console 16 is positioned between the adjacent alleys as mentioned above. The transparent plates 22 and 24, as best shown in FIG. 2, are carried on an upper plate 26 by means of brackets 28 which surround the periphery of each transparent plate. Beneath the transparent plates 22 and 24 is a lamp 30 which directs light, by means of reflectors 32 and 34, up through the transparent plates 22 and 24 and a transparent score sheet 36 positioned thereon. After passing through the plates 22 and 24 and the score sheet 36, the light is directed through a series of mirrors and lenses in housing 38 (FIG. 1) above the score sheet, where it is directed forwardly onto the aforesaid spaced screens, not shown, above adjacent bowling alleys. In this respect, the mirror and lens system within housing 38 is such that it will project the image of one score sheet for one team onto one of the spaced screens and the image of the other score sheet for the other team onto the other of the spaced screens. One type of mirror and lens system suitable for this purpose is shown, for example, in copending application Serial No. 305,591, filed August 30, 1963 and assigned to the assignee of the present application.

The housing 38 which encloses the mirror and lens system is supported by means of a downwardly-depending support 40 carried on spaced, upstanding brackets 42 and 44 which project upwardly from opposite sides of a score sheet receiving table 46 positioned beyond the transparent plates 22 and 24.

In ordinary league play, three games are played by each bowling team. Accordingly, the score sheet 36 is an elongated strip having three sets or pairs of score sheet forms arranged thereon in succession, one score sheet form of each pair being for each respective team. The score sheet 36 is formed of transparent, nonabsorbing plastic material such as Mylar (trademark) or an acetate material. However, while a truly transparent score sheet material is desired, it will be appreciated that a translucent or other similar material will also serve the purpose if it is desired to project the score, the important thing being that the score sheet material is such as to permit light to pass therethrough. Of course, if it is not desired to project the score, then the score sheet 36 can be formed from opaque material and the transparent plates 22 and 24 replaced by opaque platens. Furthermore, although various types of score sheet forms may be employed in accordance with the invention, the particular score sheet shown in FIG. 1 has the outline of a conventional blank bowling game score sheet scribed thereon. Also, the upper table surface of the table 46 is white such that when the transparent score sheet 36 passes over it, the printed characters thereon may be easily viewed and read without interference from a confusing and dark background.

In order to hold the score sheet 36 in position during a printing operation, a clamping mechanism, generally indicated at 48 in FIG. 1, is provided. The clamping mechanism 48 comprises a clamping plate 52 (FIG. 2) having two rectangular openings 54 and 56 cut therein to coincide with the transparent plates 22 and 24 and separated by a center strip 51. At the four corners of the clamping mechanism are slidable clamping elements 58 each of which may be moved into a first position where the plate 52 is raised upwardly or into a second position where the plate 52 is moved downwardly into snug, abutting relationship with plate 26. To the right of transparent plate 24, as viewed in FIG. 2, is a curved plate 70 having a downwardly-depending portion over which the transparent score sheet 36 is draped.

In order to insert the score sheet 36 beneath the clamping plate 52, the clamping elements 58 are moved to positions where the plate 52 is elevated off of the plate 26. Thereafter, the forward end of the score sheet 36 is passed beneath the plate 52 until the first set of blank score sheet forms is over each of the transparent plates 22 and 24. At this point, the clamping elements 58 are moved in the opposite direction to thereby move the plate 52 downwardly and into clamping engagement with the score sheet. The trailing end of the score sheet 36 is permitted to drape over the plate 71.

After the first game is completed, the clamping elements 58 are released, the score sheet 36 is moved until the blank forms of the next pair of the three sets of score sheet forms thereon are beneath openings 54 and 56 and over plates 24 and 22, and the clamping elements 58 again actuated to clamp the score sheet in place. The score sheet is shown in this position in FIG. 1 with the already-printed scores for the first game being over the white top of the table 46 where they may be easily viewed. Finally, during the third game, the plate 52 is again released, the third pair of score sheet forms positioned over transparent plates 22 and 24, and the plate 52 again clamped in position. The printing apparatus proper is housed within an upstanding portion 60 of the console 16 and, as mentioned above, includes means for moving the single printing wheel along the frame columns on the score sheet forms in the direction of arrow 18, and at right angles thereto in the direction of arrow 20 along the player lines of the score sheet.

With reference to FIGS. 3 and 4, the printing apparatus includes a base 62 which supports two rods 64 and 66 extending parallel to arrow 20 shown in FIG. 1. That is, the rods 64 and 66 extend parallel to the player lines on the score sheets. Carried on the rods 64 and 66 for reciprocating movement is a first carriage 68, the carriage 68 being movable in the direction of arrow 20 shown in FIG. 1. On the carriage 68 are transversely-extending rods 70 and 72 which carry, for reciprocating movement, a second carriage 74. As will be understood, the carriage 74 moves along the direction of arrow 18 in FIG. 1 parallel to the frame columns on the score sheet. Supported on the second carriage 74 are a pair of brackets 76 and 78 which carry, for pivotal movement about axis 80, an open-ended housing 82. Secured to the top of the housing 82 is the cantilever arm 12, the arrangement being such that by pivoting the housing 82 about axis 80 in a clockwise direction as viewed in FIG. 4, the printing wheel 10 will be moved downwardly to press a printing character at its lowermost portion against the score sheet 36 on the transparent plate 22 or 24.

It will be noted that the pivotal axis 80 is at the forward end of the housing 82 such that the weight of the drive motor and other parts of the printing mechanism within the housing, hereinafter described in detail, will cause the cantilever arm 12 to assume the position shown in FIG. 4 with the printing wheel 10 elevated from the score sheet 36. In order to tilt the cantilever arm about the axis 80 so as to press the printing wheel 10 against the score sheet 36, mechanismn including an upstanding solenoid 84 is provided on the carriage 74 at the rear of the housing 82. Connected to the actuating plunger of the solenoid 84 is a lever 86 pivoted about point 88 such that upon actuation of the solenoid and downward movement of its actuating plunger, the lever 86 will be caused to rotate in a counterclockwise direction as viewed in FIG. 3. The lever 86 is provided with a portion 90 extending beneath the trailing end of the cantilever arm 12 which extends entirely through the open-ended housing 82, as best shown in FIG. 4. Consequently, actuation of the solenoid 84 in the manner described above will cause the cantilever arm 12 and housing 82 to pivot about point 80 in a clockwise direction as viewed in FIG. 4 to press the print wheel 10 against the score sheet 36. It will be appreciated that in this manner the type impression is produced on the score sheet 36.

Figure 5:
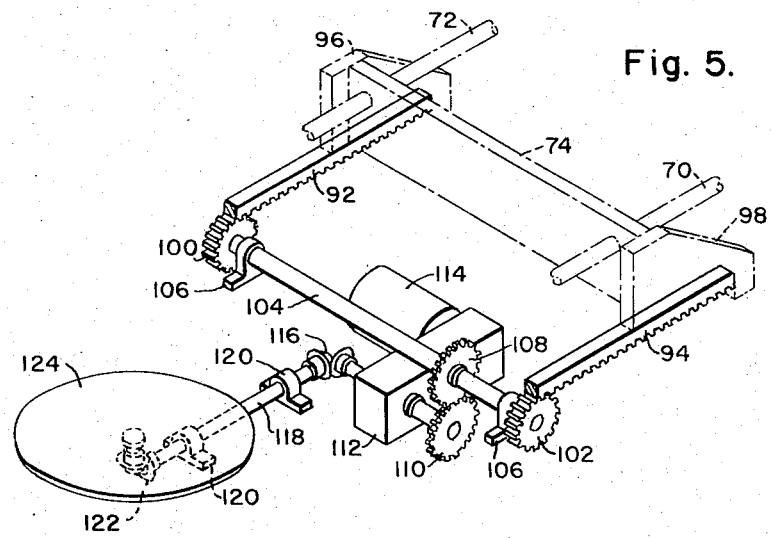
FIG. 5 is a perspective view showing the drive mechanism for one of the two carriages of the printing apparatus of the invention.

With reference now to FIG. 5, the drive mechanism for the carriage 74 is shown and includes racks 92 and 94 secured to the undersides of side plates 96 and 98, respectively. The racks 92 and 94, in turn, engage pinion gears 100 and 102 carried at the opposite ends of a transversely-extending shaft 104, this latter shaft being supported on the lower carriage 68 by means of bearing blocks 106. Thus, upon rotation of the shaft 104 and gears 100 and 102 in one direction, the carriage 74 will be caused to traverse the rods 70 and 72 in one direction along arrow 18 shown in FIG. 1; whereas the rotation of the shaft 104 in the opposite sense will cause movement of the carriage 74 and the cantilever arm 12 carried thereby in the other direction.

Also secured to the shaft 104 is a gear 108 which meshes with gear 110 connected to a gear reducer 112. The gear reducer 112 is connected to an electric motor 114 carried on the lower carriage 68. The gear reducer 112 is also connected through bevel gears 116 to a shaft 118 supported on bearing blocks 120, these latter bearing blocks also being carried on the lower carriage 68. Finally, the shaft 118 is connected through bevel gears 122 to a code disc, schematically illustrated at 124 in FIG. 5. As will hereinafter be explained, the code disc 124 is operative in conjunction with light sources and photocells for correctly positioning the cantilever arm 12 along the direction of arrow 18 shown in FIG. 1.

Figure 6:
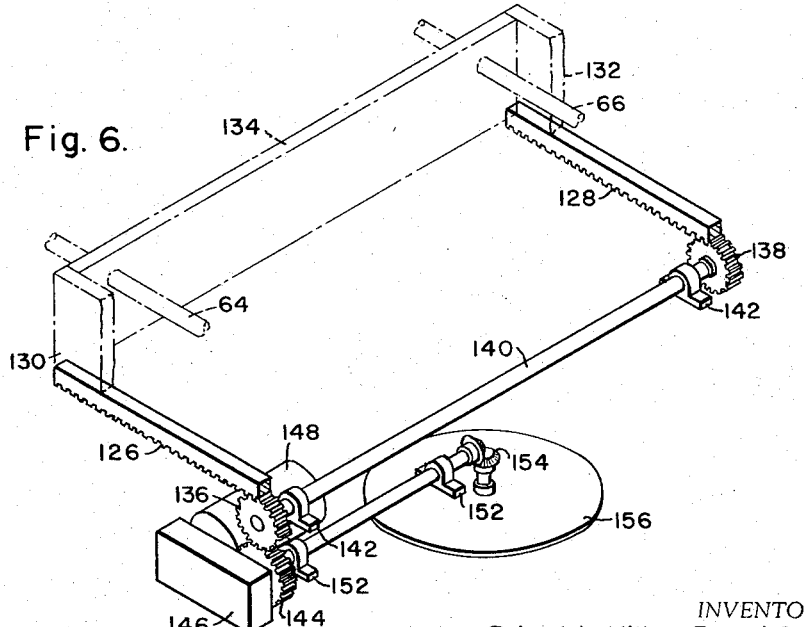
FIG. 6 is a perspective view of the drive mechanism for the other of the two carriages of the printing apparatus of the invention.

With reference now to FIG. 6, the drive mechanism for the lower carriage 68 is shown; and it will be noted that it includes a pair of racks 126 and 128 carried on the lower edges of a pair of side members 130 and 132 of the lower carriage 68. Extending through end plates on the carriage 68 are the rods 64 and 66, one of said end plates being schematically illustrated in FIG. 6 and identified by the reference numeral 134. The racks 126 and 128, in turn, engage or mesh with pinion gears 136 and 138 supported on the ends of a shaft 140 which is carried on the base 62 by means of bearing blocks 142. The gear 136 also engages a gear 144 connected to a gear reducer 146. The gear reducer 146, in turn, is driven by an electric motor 148 also supported on the base 62. Connected to the gear 144 is a shaft 150 carried in bearing blocks 152 and connected at its forward end through bevel gears 154 to a code wheel 156. The code wheel 156, like code wheel 124, is employed in conjunction with light sources and photocells in a manner hereinafter described for positioning the printing wheel 10 at the correct position along the direction of arrow 20 shown in FIG. 1.

In the illustration given, there are two score sheets, each having a maximum of five player lines thereon. Accordingly, the code wheel 124 of FIG. 5 must be such as to stop the printing wheel 10 at any one of twenty-three different positions along the direction of arrow 18 in FIG. 1. That is, there are five player lines on each score sheet, and in each player line the printing wheel will have to be positioned to print ball results and also scores beneath the ball results. This, in combination with the spaces required to print a team total on each score sheet and the necessity of means for positioning the printing wheel 10 intermediate the score sheet forms and over center strip 51 (FIG. 2) when not in use makes a total of twenty-three. The code wheel 156 is similar to code wheel 124 except that it must be such as to stop the printing wheel 10 at any one of thirty different positions along the direction of arrow 20 shown in FIG. 1. The necessity for thirty positions will hereinafter be described more fully in detail.

In order to accurately position the carriages 68 and 74 and, hence, the printing wheel 10 over any desired printing space, means including two solenoids 158 and 160 (FIGS. 3 and 4) are employed. The solenoid 158 is carried on the carriage 68 and is connected through rod 162 and lever assembly 166 to a rack section 168. Upon energization of the solenoid 158, the rod 162 and lever assembly 166 will force the rack section 168 upwardly into engagement with the rack 94; and if the pinion gears 100 and 102 have not exactly positioned the printing wheel 10 over the correct position, the rack section 168, upon being forced into the rack 94, will move the carriage 74 to the left or right slightly, as the case may be, in order to exactly position the printing wheel at the correct space along the player lines. Coil spring 170 normally maintains the rack section 168 out of engagement with rack 94.

Similarly, the solenoid 160 is connected through actuating rod 172 and lever assembly 174 with rack section 176 adapted to engage the rack 128 for the same purpose as rack section 168. Here, again, a coil spring 178 normally maintains the rack section 176 out of engagement with the rack 128.

With reference now to FIGS. 7 and 8, it will be noted that the cantilever arm 12 comprises an outer casing having side walls 180 and 182 and an edge wall 184 which curves around the printing wheel 10 to form an enclosure therefor. Carried on the plate 182, as best shown in FIG. 7, is a circular plate 186 which supports a bronze or the like bushing 188. A similar circular plate 190 of smaller diameter is carried on the side wall 180. Extending between the plates 188 and 190 is a central axle or shaft 192 having keyed thereto a bevel gear member 194. Secured to the shank portion of the bevel gear member 194 is the printing wheel 10 comprising an inner annular metallic portion 196 having a rubber or the like band 198 extending around its periphery. Integrally formed with the rubber band 198 are a plurality of type characters 200.

Meshed with the bevel gear member 194 is a bevel gear 202 carried on a drive shaft 204 which extends along a recess 206 in the side wall 182 and has at its other end (FIG. 7) a second bevel gear 207 meshed with a bevel gear 208. It will be appreciated that when the bevel gear 208 is forcibly rotated, it will rotate shaft 204 as well as the printing wheel 10. The manner in which this is accomplished in order to position a preselected one of the printing characters 200 at the bottom of the printing wheel 10 will hereinafter be described.

It will be noted in FIG. 8 that the bottom portion of the edge plate 184 surrounding the printing wheel 10 is cut away to provide an opening or aperture 210. In this manner, the lowermost of the printing characters 200 is exposed and may be pressed against a score sheet 36 on the transparent plate 22, for example. However, in order to produce a printed character on the score sheet 36 it is, of course, necessary to have a source of ink. In the embodiment of the invention shown in FIG. 8, this is provided by means of an inked ribbon 212 which passes over the outer surface of the edge plate 184 and over the aperture 210. As shown in FIG. 4, the ribbon 212 is unwound from a storage roll 214 and passes over rollers 216 and 218. From the roller 218 it passes over the aperture 210 and thence over the outer surface of edge plate 184. After passing backwardly under the open-ended housing 82, the ribbon 212 is wound upon a takeup roll 220 at the rear of the apparatus. Ratchet means, not shown herein, is provided for the roll 220 whereby it will be advanced through an increment each time the housing 82 and cantilever arm 12 are tilted downwardly to press a printing character 200 on the score sheet 36. Thus, the ribbon is advanced each time a type impression is produced on the score sheet 36. If desired, a thin steel cover, not shown, of U-shaped cross section, may be placed over the top of the arm 12 to provide a housing over the tape 212.

Although the invention is not limited to the use of any specific type of inked tape, one which has been found satisfactory is that manufactured by Buckeye Ribbon & Carbon Company, Cleveland, Ohio, and identified as their No. 272 Cotton Ribbon plasticized on one side and impregnated with a No. 78 ink, the plasticized side, of course, being that opposite the score sheet 36. It is, however, necessary to employ an ink which will remain moist after printing such that the printed characters may be wiped off the transparent, nonabsorbent score sheet 36, which is thereafter used for subsequent bowling games. Also, the use of an ink which remains moist after printing enables the printed scores to be transferred to a translucent, absorbent paper by pressing the absorbent paper against the transparent score sheet.

As will hereinafter be explained, the cantilever arm 12 is positioned intermediate the transparent plates 22 and 24 shown in FIGS. 1 and 2 at all times except during an actual printing operation. Accordingly, as an alternative to the tape 212 an inked pad may be positioned on the center piece 51 of the clamp 52, the arrangement being such that during each printing operation the printing wheel will be initially rotated to the position where the correct type character 200 is at its lowermost portion, the solenoid 84 actuated to press the type against the inked pad, and the cantilever arm 12 thereafter moved into position for printing. This procedure, of course, would be repeated during each printing cycle. The type characters 200 on printing wheel 10 are, of course, oriented so that their axes from top to bottom as viewed for normal reading are parallel to the axis of the printing wheel. This is in contrast to the ordinary printing wheel wherein the same axes of the characters are rotated 90° with respect to the axis of the printing wheel. As will be understood, the unique arrangement shown herein facilitates positioning of the printing wheel such that it lies in a plane coincident with that of the arm 12, thereby enabling a very thin overall assembly which presents a minimized obstruction during printing.

With reference now to FIG. 9, it will be noted that the shaft 204 is connected through bevel gears 207 and 208 to a vertically disposed shaft 224 carried in a bearing block 226 supported on the bottom of the open-ended housing 82. Keyed or otherwise securely fastened to the shaft 224 so as to rotate therewith is a gear 228. The gear 228 is formed from transparent, or substantially transparent, material such that light from five small light sources A1, A2, A4, A8 and AZ may shine therethrough and onto a photocell, generally indicated at 230. As will hereinafter be explained, the lamps A1–AZ and photocell 230 are employed in combination with electrical circuitry for actuating a solenoid, schematically illustrated at 232. The solenoid 232, in turn, actuates a lever 234 which is adapted to engage any one of a plurality of projections 236 circumferentially spaced around the top of the gear 228. There are sixteen such projections 236 on the printing wheel 10, best shown in FIG. 13. As will be seen, the gear 228 is caused to rotate in one direction, and when the solenoid 122 is deenergized, the lever 234 will be moved downwardly under the force of spring 235 to engage one of the projections 236, thereby stopping the printing wheel 10 with an associated one of the type characters 200 at the lowermost position on the printing wheel preparatory to printing. In FIG. 9, solenoid 232 is illustrated in its energized condition. The solenoid 232 and the positioning of the printing wheel 10 is controlled by means of the lamps A1–AZ and the photocell 230 in a manner hereinafter described.

The gear 228 is connected to a gear 237 slideably mounted on an upstanding shaft 238. The shaft 238 is journaled at its upper end in a bearing block 240 carried on the undersurface of the top of the open-ended housing 82, and at its lower end is mounted on a gear reducer 242. Projecting upwardly from the gear reducer 242 is a shaft which carries a gear 244. The gear 244 is connected through the gear reducer 242 to an electric drive motor 246 and meshes with a gear 248 secured to the upstanding shaft 238. With this arrangement, as the motor 246 rotates, gears 244 and 248 will also rotate along with the shaft 238. Beneath the gear 237 is a collar 250 secured to the shaft 238. Similarly, secured to the shaft 238 above the gear 237 is a second collar 252. Between the collar 252 and the upper surface of gear 237 is a leaf spring 254. The arrangement of collars 250 and 252 in combination with leaf spring 254 and gear 237 comprise a slip clutch arrangement. That is, as long as the gears 228 and 237 can rotate freely, the frictional resistance between the collar 250 and the underside of gear 237 will cause the gears 237 and 228 to rotate with shaft 238. When, however, the gear 228 is positively stopped as by engagement of lever 234 with one of the projections 236, the gears 228 and 237 will stop while the motor 246, gear 244, gear 248 and shaft 238 continue to rotate.

The lamps A1, A2, A4, A8 and AZ are radially spaced along a straight line at top of the gear 228 and, as mentioned above, are such as to direct beams of light against a photocell element 230 positioned on the lower side of the gear 228 directly opposite the lamps A1–AZ. The photocell 230 will conduct an electric current whenever one or more of the light sources A1–AZ is directed thereon. In other words, the photocell 230 will not conduct only when all of the lamps A1–AZ are deenergized or their light beams are blocked from the field of view of the photocell.

The lamps A1–A8, the gear 228 and the photocell 230 comprise a means for controlling the printing wheel 10 so as to position a preselected type character 200 at the lowermost position on the print wheel 10 preparatory to printing. The manner in which this is accomplished may best be understood by reference to FIG. 13 showing the face of the transparent gear 228. Before proceeding with the description of the gear 228, however, it should be explained, that electrical intelligence in binary code form is utilized to control the lamps A1–A8. In this respect, the lamp A1, when energized, represents the binary bit 1; the lamp A2, when energized, represents the binary bit 2; the lamp A4, when energized, represents the binary bit 4; and the lamp A8, when energized, represents the binary bit 8. As will be understood, the number of lamps may be extended to suit requirements, in which case the next lamp would represent the binary bit 16; the next would represent the binary bit 32, and so on. The lamp AZ does not represent in this case a binary bit, but is used to establish a starting position from which the printing wheel rotates during each printing cycle. The manner in which this is accomplished will hereinafter be described.

In accordance wth the well known binary system, if lamps A1 and A8, for example, are energized, this condition is representative of the decimal number 9; if lamps A4 and A2 are energized, this is representative of the decimal number 6; if lamps A1 and A2 are energized, this is representative of the decimal number 3; and so on.

With specific reference, now, to the gear 228 shown in FIG. 13, it will be noted that it is divided into a plurality of sectors numbered 1 through 0, (X), (—), (/), (o) and (F). Each of the sectors, in turn, is subdivided into five ring sectors 256, 258, 260, 262 and 264. The ring sector 256 is in the path of the light beam between lamp AZ and photocell 230; the ring sector 258 is in the path of the light beam between lamp A8 and photocell 230; the ring sector 260 is in the path of the light beam between the lamp A4 and photocell 230; the ring sector 262 is in the path of the light beam between lamp A2 and photocell 230; and ring sector 264 is in the path of the light beam between lamp A1 and photocell 230.

As will be seen, lamp AZ is energized whenever all other lamps A1–A8 are deenergized. Conversely, during a printing cycle when one or more of the lamps A1–A8 are energized, the lamp AZ is deenergized. The major portion of the gear 228 is transparent except for the blackened ring sectors shown in FIG. 13 which are opaque. Thus, whenever one of these opaque ring sectors reaches the position of lamps A1–AZ and photocell 230, it will block light between its associated lamp and the photocell. Remembering that the photocell 230 will conduct whenever light from any one of the lamps A1–A8 is directed thereon, it can be seen that by providing a pattern of opaque ring sectors which matches the energized lamps, light from the lamps will be blocked from the photocell 230 whenever that particular combination of opaque ring sectors reaches the top dead center position shown in FIG. 13 which matches the corresponding combination of energized lamps A1–A8. The absence of conduction in the photocell 230 is used to deenergize the solenoid 232 by suitable circuitry, hereinafter described in connection with FIG. 14. In this manner, the printing wheel 10 is stopped such that the type character 200 corresponding to the binary code established by the lamps A1–A8 is stopped at the lowermost position of the printing wheel preparatory to printing.

Let us assume, for example, that the electrical intelligence fed to the lamps A1–A8 indicates that a 3 should be printed by the printing wheel 10. Under these circumstances, the lamps A1 and A2 will be energized. The system is such that the gear 237 will rotate the gear 228 through a maximum of about 720° or two complete revolutions. Furthermore, the gear 228 always rotates in the direction of arrow 266 shown in FIG. 13. In order for the system to operate properly, the direction of rotation always must be that indicated by the arrow 266, the lamps A1–A8 must not be energized until the angular position of the gear 228 is that shown in FIG. 13 with the number 1 positioned just to the right of top dead center. Accordingly, the lamp AZ is provided which becomes energized initially in the printing cycle before lamps A1–A8 become energized. Energization of lamp AZ causes energization of solenoid 232; whereupon the lever 234 will release gear 228 which rotates in the direction of arrow 266 shown in FIG. 13 until opaque area 268 is reached. At this point, the photocell 230 will deenergize solenoid 232 to stop the gear 228 and the printing wheel. Lamp AZ remains energized until the motor 246 has rotated through a sufficient number of revolutions to rotate gear 228 through a maximum of at least one revolution. This will bring the gear 228 to the top dead center position shown in FIG. 13 regardless of its angular position during the preceding printing operation.

Let us assume, for example, that the number 1 was printed during the preceding printing operation and that lamps A1 and A2 are to be energized during the next printing operation, indicating that the printing character representing the numeral 3 should be positioned at the lowermost position on printing wheel 10 preparatory to the succeeding printing operation. Under these circumstances, lamp AZ will be energized and gear 228 will rotate in the direction of arrow 266 until opaque area 268 is reached, whereupon solenoid 232 will become deenergized to stop the gear. Thereafter, lamps A1 and A2 become energized to again energize solenoid 232, and the gear 228 continues to rotate. As the number 1 sector on gear 228 passes between the lamps A1–AZ and photocell 230, only the ring sector 264 in front of lamp A1 is opaque, meaning that light from lamp A2 will still shine on the photocell 230 through ring sector 262 which is transparent in this position. When the second sector passes the lamps, ring sector 262 in front of lamp A2 will block its light from the photocell 230; however ring sector 264 in sector 2 is transparent so that light from lamp A1 still shines on the photocell 230. When, however, the third sector is reached, both ring sectors 262 and 264 are opaque; and since only lamps A1 and A2 are energized, all light will be blocked from the photocell 230. This actuates circuitry, not shown herein, to deenergize the solenoid 232 and stop the printing wheel 10 with the type character 3 at its lowermost position. When the gear 228 stops, the gear 237 also stops; however, the shaft 238 continues to rotate through an amount sufficient to effect two complete revolutions of the gear 228 with the gear 237 sliding on the shaft 238.

Reverting again to FIG. 13, it will be seen that the first nine and thirteenth sectors are representative of the numerals 1-0, the tenth sector is representative of a strike indicated by the symbol (X), the eleventh sector is representative of a spare indicated by the symbol (/), the twelfth sector represents a blow indicated by the symbol (—), the fourteenth sector represents a split indicated by the symbol (o), and the fifteenth sector represents a foul indicated by the symbol (F). If an energized lamp is indicated in binary notation by a 1 and a deenergized lamp by a 0, the printer code will be as follows:

| Code | | | | Print |
|---|---|---|---|---|
| 8 | 4 | 2 | 1 | |
| 0 | 0 | 0 | 0 | Blank (no character printed—all lamps deenergized) |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |
| 1 | 0 | 0 | 0 | 8 |
| 1 | 0 | 0 | 1 | 9 |
| 1 | 0 | 1 | 0 | 0 |
| 1 | 0 | 1 | 1 | (X) |
| 1 | 1 | 0 | 0 | (—) |
| 1 | 1 | 0 | 1 | (/) |
| 1 | 1 | 1 | 1 | (F) |
| 1 | 1 | 1 | 0 | (o)—split |

Furthermore, from a consideration of the disc shown in FIG. 13, it can be seen that light will always shine on its associated photocell until the sector is reached, corresponding to the energized lamps, assuming that the cycle is always initiated from the starting position shown in FIG. 13 with lamp AZ extinguished and with the disc rotating in the direction of arrow 266. This is not necessarily true, however, if the lamps are energized when the disc starts rotating at some position or other than that shown in FIG. 13. It is for this reason that the gear is always brought to the position shown in FIG. 13 before the lamps A1-A8 are energized by energizing lamp AZ to rotate the gear to the top dead center position shown in FIG. 13 where the opaque area 268 blocks its light from the photocell. It also explains why the rotation of shaft 238 must be such as to rotate the gear 228 through almost two complete revolutions. That is, the gear 228 will remain in its previously-established position following a printing operation. Let us assume that a number 1 was printed in the previous cycle and that energization of lamps A1-A8 on the next cycle indicates that a foul mark (F) should be printed. This will then take almost one complete revolution for the disc to reach the top dead center position shown in FIG. 13 and almost another complete revolution for the disc to reach the foul (F) mark.

The circuitry for energizing selected ones of the lamps in accordance with electrical intelligence in binary form is the subject of copending application Serial No. 338,411, filed January 17, 1964. Such circuitry is shown schematically in FIG. 16 and includes apparatus 271 for automatically detecting and totalizing the score for each player on two teams. Connected to the apparatus 271 are five switches P1-1 to P1-5 for the players on one team and five switches P2-1 to P2-5 for the players on the other team. The arrangement is such that when a bowler prepares to bowl, his associated switch will be closed, thereby enabling connection of his associated storage circuit in apparatus 271 to the lamps A1-AZ. Such a storage circuit contains information concerning the frame in which the bowler should be bowling, his accumulated score, and recorded but unscored marks. Thus, when a particular player switch is closed, selected ones of the lamps A1-A8 will be energized according to the information stored in that player's storage circuit during a score printing operation, or according to the pinfall achieved by that player in the frame being played when it is desired to print ball results. The lamp AZ will be energized initially in each printing operation, followed by energiaztion of appropriate ones of the lamps A1-A8. Thus, the printing wheel 10 will be rotated to the position dictated by the electrical intelligence from apparatus 271 energizing selected ones of the lamps A1-A8. At this position, all light will be blocked from photocell 230, and the solenoid 232 will be deenergized to stop the printing wheel through circuit 273. At the same time, circuit 273 will cause actuation of solenoid 84 in properly timed sequence to press the type character 200 at the bottom of printing wheel 10 against the score sheet 36, thereby effecting a printing operation. Of course, the type character at the bottom of the printing wheel 10 is that dictated by the combination of energized lamps A1-A8 as was explained above.

With reference now to FIGS. 10-12, another embodiment of the invention is shown wherein the printing wheel 10 is replaced by means of a continuous band 272 which travels around a wheel 274 at the forward end of the cantilever arm 12 and a drive wheel 276 disposed within the open-ended housing 82. The drive wheel 276 is connected through gear reducer 278 to shaft 224' and gear 228' which correspond to elements 224 and 228 shown in FIG. 9. Spaced along the length of the band 272, which may be formed from rubber or the like, are spaced type characters 280 corresponding to the type characters 200 spaced around the printing wheel 10 shown in FIG. 8. In order to ink the type characters 280 on the band 272, the arrangement shown in FIG. 11 is provided which comprises an upper roll 282 and a lower roll 284 having flanges 286 which press the band 272 against the roll 282. Between the flanges 286 is printing pad material 288 supplied from a suitable source of ink, not shown. With the arrangement illustrated, the band 272 will pass between the rolls 282 and 284 with the type characters 280 engaging the ink pad material 288. In this manner, of course, the ink is transferred to the type characters 280 such that when they are pressed against the score sheet 36, an inked impression will be created.

The forward wheel 274 corresponds somewhat to the printing wheel 10 shown in FIG. 8 in that the printing type 280 at its lowermost position is pressed against the score sheet 36 when the cantilever arm 12 is pivoted downwardly. The band 272 is guided around the wheel 274 by flanged rollers 290, one of which is shown in FIG. 12. It will be noted that the flanged rollers permit the type characters 280 to pass without contacting any part thereof. The arrangement shown in FIGS. 10, 11 and 12 has an advantage over that shown in FIGS. 7 and 8 in that the width of the cantilever arm 12 can be reduced due to the fact that the drive shaft 204 is eliminated, thereby further reducing any obstruction of the score sheet which occurs during printing.

With reference, now, to FIGS. 14 and 16, the player position code wheel 124 of FIG. 5 and its associated control circuitry are shown in detail. The code wheel 124 is formed from transparent material in a manner similar to the gear 228 of FIG. 13 and is divided into sectors, each sector being divided into ring sectors which are either transparent or opaque. It will be noted in FIG. 1 that the print wheel 10 must be positioned over either one of two score sheet forms. Accordingly, the innermost ring 276 controls which one of the score sheet forms the printing wheel 10 is positioned over; the next three rings 278, 280 and 282 determine which player line the printing wheel will be positioned over or whether it will be positioned at the lower edge of the score sheet to print a total team score; and the ring 284 controls whether the printing wheel will be positioned over the ball results boxes or score space of a particular frame box.

With reference to FIG. 16, it will be noted that the detecting, totalizing and printing apparatus 271 is provided with four output leads labeled T, B4, B2, B1 and BS. The signals on these leads are in binary form and are either ON or OFF in accordance with well known binary notation. The signals on lead T control which one of the score sheet forms over which the printing wheel 10 will be positioned; the signals on leads B4–B1 control which one of the player lines the printing wheel will be over or whether it will be over the team total score space; and the signal on lead BS determines whether the printing wheel will be positioned over a ball results box or score space in a particular frame box.

Radially spaced along one side of the player position code disc 124 are five lamps identified in FIG. 16 as PL–T, PL–4, PL–2, PL–1 and PL–BS. On the other side of the code disc 124 directly opposite the lamps PL–T to PL–BS are five photocells PP–T, PP–4, PP–2, PP–1 and PP–BS, shown only in FIG. 16. The lamps PL–T through PL–BS are continuously energized and will direct light on their associated photocells PP–T through PP–BS unless an opaque area on the code wheel 124 is disposed therebetween. It will be assumed that when light shines on one of the photocells, it will produce an ON signal; whereas when light is blocked between the photocell and its associated light source, an OFF signal is produced. Furthermore, it will be noted from FIG. 14 that the light source PL–T to PL–BS are each positioned within the annulus described above which controls a particular function in accordance with the binary notation at the output leads from the detecting and totalizing apparatus 271.

In the operation of the system shown in FIG. 16, the signals on leads T–BS at the output of circuit 271 are compared with the signals produced by the photocells PP–T through PP–BS to determine whether the motor 114 should rotate in a forward or reverse direction. The motor 114 is connected, as shown in FIG. 16, to a motor control circuit 286 which, in turn, is connected to two OR circuits 288 and 290. When a signal appears at the output of OR circuit 288, the motor 114 will be caused to rotate in a reverse direction as indicated by one arrow in FIG. 14. On the other hand, when an output signal appears from OR circuit 290, the motor 114 will be caused to rotate in a forward direction as indicated by the other arrow in FIG. 14.

The motor 114 is controlled by means of a binary comparator which includes a plurality of modules MT, MB4, MB2, MB1 and MBS all connected in cascade. It will be noted, however, that only three of the modules MT, MB4 and MBS are shown in FIG. 16. Each of the modules is essentially the same and consists of two AND circuits 292 and 294 having their outputs connected to an OR circuit 296. The OR circuit, in turn, is connected through an inverter 298 to the AND circuits 292 and 294 in all successive modules. The lead T at the output of the detecting and totalizing apparatus 271 is connected through an inverter 300 to AND circuit 292, and also is connected directly to AND circuit 294. The output of photocell PP–T, on the other hand, is connected directly to the AND circuit 292 and to the AND circuit 294 through an inverter 302.

As will hereinafter be explained, whenever the output signal on lead T matches that produced by the photocell PP–T, no output signals will appear from AND circuits 292 and 294 in module MT. When, however, the signal on lead T does not match that from photocell PP–T, an output ON signal will appear from one or the other of the AND circuits 292 or 294. This ON signal is applied through OR circuit 296 to the inverter 298 which produces an OFF signal applied to the AND circuits 292 and 294 in all succeeding modules. Thus, as long as an ON signal appears at the output of one of the two AND circuits 292 or 294 in module MT, the module MB4 and all succeeding modules will be disabled. When, however, OFF signals appear at the outputs of AND circuits 292 and 294 in module MT, the module MB4 will be enabled; and it will, in turn, disable the succeeding modules through its OR circuit 296 if ON signals appear at the outputs of either one of its AND circuits 292 and 294. In this way, only one module is operative at any one time, the module MT operating first, followed by module MB4, and so on down to module MBS.

When an ON signal appears at the output of AND circuit 292 in any one of the modules MT–MBS it is applied to the reverse OR circuit 288 and AND circuit 289 to cause the motor control circuit 286 to rotate motor 114 in a reverse direction. Similarly, when an ON signal appears at the output of AND circuit 294 in any one of the modules MT–MBS, an ON signal will be applied to the forward OR circuit 290 and AND circuit 291 to cause the motor 114 to rotate in a forward direction. AND circuits 289 and 291 are enabled to pass signals only when an ON signal is applied thereto from circuit 271 via lead 293. This enables a particular sequence of lamps PL–T to PL–BS to be energized as soon as a player switch P1–1 through P2–5 is depressed, but delays movement of the printing wheel from its center position over center strip 51 where it does not obstruct either score sheet until a printing operation is desired.

Let us assume, for example, that the disc 124 is positioned as shown in FIG. 14 and that lamps PL–T and PL–BS are deenergized while the remainder are deenergized. Under these circumstances, the print wheel 10 will be in the center position shown in FIG. 1 between the two score sheet forms since light will not fall on any of the photocells to cause rotation of motor 114. Let us assume, now, that the intelligence from the detecting and totalizing apparatus 271 indicates that the print wheel should move to the fourth player line on the score sheet form for team 2 and that it should print a ball result. Under these circumstances, the outputs on leads T–BS will be as follows:

T—OFF     B1—ON
B4—OFF    BS—ON
B2—ON

Thus, an OFF signal will appear on lead T while an ON signal will appear at the output of photocell PP–T since it is exposed to the light from lamp PL–T. The ON signal, after being inverted in inverter 302 will appear as an OFF signal as applied to AND circuit 294. Consequently, the output of AND circuit 294 will be OFF. The OFF signal on lead T, however, after having been inverted in inverter 300, will appear as an ON signal as applied to AND circuit 292. This ON signal, coupled with the ON signal applied from photocell PP–T, will cause the AND circuit 292 to produce an output ON signal which is applied to the reverse OR circuit 288 to cause motor 114 to rotate disc 124 in the reverse direction shown in FIG. 14. At the same time, the existence of an ON signal at the output of AND circuit 292 will cause, through OR circuit 296 and inverter 298, disabling of all succeeding modules MB4 through MBS.

After the disc 124 has rotated a short distance in the reverse direction as shown in FIG. 14, an opaque strip will be interposed between the lamp PL–T and photocell PP–T, meaning that an OFF signal will now be applied to AND circuit 292. Consequently, the module MT can no longer be effective to cause reverse motion of the motor 114. At the same time, however, the absence of an ON signal at the output of AND circuit 292 enables the AND circuits 292 and 294 in module MB4 through the inverter 298. The signal on lead B4, as explained above, is now OFF while that at the output of photocell PP–4 is ON. The result is that an ON signal will appear at the output of AND circuit 292 in module MB4. The OFF signal on lead B4, after inversion in inverter 292 in module MB4 now produces an output ON signal from AND circuit 292 in module MB4. This ON signal, when applied through the reverse OR circuit 288, causes continued reverse motion of the disc 124 as viewed in FIG. 14. This reverse motion will continue until the sector identified by the numeral 300 in FIG. 14 is reached, whereupon the light will be blocked from photocell PP–4 such that it will produce an output OFF signal. The result is that OFF signals appear from both AND circuits 292 and 294 in module MB4. Since ON signals appear on leads B2, B1 and BS in the example given above, and since the photocells PP–2, PP–1 and PP–BS are exposed to produce output ON signals, the modules associated with these photocells will not actuate the motor 114. The motor 114, therefore, stops with the print wheel over the fourth player line and positioned above the ball results boxes. The detecting and totalizing apparatus 271 will then actuate the printing wheel control mechanism to effect a printing operation. If, following the results printing operation, it is desired to print a score in the fourth player line on the score sheet form for the second team, the signal on lead BS will change from an ON signal to an OFF signal. Consequently, an output ON signal will appear from AND circuit 292 in module MB5 to again cause the motor 114 to rotate in the reverse direction through OR circuit 288 and control circuit 286 until the next successive sector 302 is reached, whereupon the printing wheel will stop above the score space.

If it is now desired to return the printing wheel 10 to its center position, OFF signals will appear on the leads B4, B2 and B1 while ON signals will appear on leads T and BS. Consequently, the ON signal on lead T, coupled with the OFF signal from photocell PP–T, after inversion in inverter 302 in module MT, will cause AND circuit 294 in module MT to produce an output ON signal. This output ON signal will actuate the OR circuit 290 to cause motor control circuit 286 to rotate motor 114 in the forward direction as viewed in FIG. 14 until sector 303 is reached. At this point, due to the fact that lead BS has an ON signal thereon, the disc 124 will continue to rotate in the forward direction until the "center" sector is reached where the printing wheel 10 is between the score sheets.

On the other hand, if player 4 on team 1 is to bowl, the signals on leads T–BS will be as follows:

T—ON　　　　　B1—ON
B4—OFF　　　　BS—ON
B2—ON

In accordance with the explanation given above, this causes the motor 114 to rotate the disc 124 in the forward direction shown in FIG. 14 until sector 304 is reached, assuming that a results print operation is to be performed.

From the foregoing description, it will be appreciated that the score sheet for team 1 in accordance with the nomenclature used in FIG. 14 will be ahead of that for team 2 as indicated in FIG. 1. Furthermore, as the disc 124 rotates in the forward direction from its extreme team 2 total sector 305 to its extreme sector 307 where ball results for the first player on team 1 are printed, the printing wheel 10 in FIG. 1 moves from the bottom of the team 1 score sheet to the top of the team 2 score sheet along the direction of arrow 18. Rotation of the disc 124 from sector 307 in the reverse direction will, of course, effect the opposite result.

It will be noted that on either side of the center sector in FIG. 14 are sectors marked "blank." These sectors are included because the width of the center strip 51 shown in FIG. 2 is greater than that of the individual player lines. The disc 124 and printing wheel 10, however, do not stop at these positions.

From a consideration of the code disc shown in FIG. 14, it will be appreciated that the cumulative binary notation advancing from sector 307 to sector 305 represents successively increasing decimal numbers. Thus, the binary and corresponding decimal notations advancing from sector 307 are as follows:

|  | BS | 1 | 2 | 4 | T | Decimal |
|---|---|---|---|---|---|---|
| Team 1: |  |  |  |  |  |  |
| Player 1—ball results | 0 | 1 | 0 | 0 | 0 | 2 |
| Player 1—score | 1 | 1 | 0 | 0 | 0 | 3 |
| Player 2—ball results | 0 | 0 | 1 | 0 | 0 | 4 |
| Player 2—score | 1 | 0 | 1 | 0 | 0 | 5 |
| * * * | * | * | * | * | * | * |
| Player 5—score | 1 | 1 | 0 | 1 | 0 | 11 |
| Team 1 Total | 0 | 0 | 1 | 1 | 0 | 12 |
| Blank | 1 | 0 | 1 | 1 | 0 | 13 |
| Center | 0 | 1 | 1 | 1 | 0 | 14 |
| Blank | 1 | 1 | 1 | 1 | 0 | 15 |
| Team 2: |  |  |  |  |  |  |
| Player 1—ball results | 0 | 1 | 0 | 0 | 1 | 18 |
| Player 1—score | 1 | 1 | 0 | 0 | 1 | 19 |
| * * * | * | * | * | * | * | * |
| Team 2 Total | 0 | 0 | 1 | 1 | 1 | 28 |

This arrangement of successively increasing or decreasing binary numbers along the direction of movement of printing wheel is necessary in order for the binary comparator of FIG. 16 to determine whether the disc and printing wheel should move in a forward or reverse direction.

The frame position disc 156 shown in FIG. 15 is similar to that shown in FIG. 14, except that the disc in this case is divided into six annular areas rather than five. Furthermore, at the output of the detecting and totalizing apparatus 271 shown in FIG. 16 are six leads identified as F8, F4, F2, F1, FP2 and FP1. The code disc 156 and the leads F8–FP1 are utilized to position the printing wheel in the direction of arrow 20 shown in FIG. 1 and over a particular frame box. Since there are ten frame boxes, four binary bits established by the signals on leads F8–F1 are required for determining the particular frame over which the printing wheel 10 should be positioned. The signals on leads F8–F1 are matched with those produced by photocells, not shown, responsive to light from lamps FL–1, FL–2, FL–4 and FL–8 at the inner four annular areas of disc 156 shown in FIG. 15. It may be necessary in the case of a score printing operation or in the case of a bonus ball in the tenth frame to position the printing wheel 10 at any one of three different places within the same score box along the direction of arrow 20. For example, it may be necessary to print both units, tens and hundreds in the score, three ball results in the tenth frame or two ball results and a split indication in any other frame. For this purpose, the leads FP1 and FP2 are utilized in combination with lamps FPL–1 and FPL–2 in the outer two annular areas of disc 156, and it will be appreciated that the maximum achievable number produced in accordance with the binary system on these two leads is 3, this corresponding to the maximum number of required positions within any one score box. In this respect, it will be appreciated that ball results are printed directly above an associated digit in the score to accommodate a maximum of three ball results, two ball results and a split indication or three digits in the score.

The operation of the code disc 156 can be appreciated from an examination of FIG. 15. This disc, in combination with the six lamps FL–8, FL–4, FL–2, FL–1, FPL–2, FPL–1, and their associated photocells, not shown, control the drive motor 148 shown in FIG. 6 such that it may be rotated in either a forward or reverse direction to properly position the printing wheel 10 along the direction of arrow 20 shown in FIG. 1 according to the electrical intelligence on the leads F8–FP1.

For example, suppose that the second ball result is to be printed in the eighth frame. In order to position the printing wheel over the eighth frame, lead F8 will have an OFF signal thereon while leads F1, F2 and F4 all have ON signals. At the same time, lead FP2 will have an OFF signal thereon, while lead FP1 also has an OFF signal thereon. This combination of signals will be matched with sector 311 in FIG. 15 to stop the printing wheel at the eighth frame, and above the second result box. If it were to stop at the first result box, then lead FP2 would have an OFF signal thereon, while lead FP1 would have an ON signal, thereby moving sector 313 into alignment with the lamps. In the case of a split in the eighth frame, an OFF signal would be on lead FP1 and an ON signal on FP2 to stop disc 156 at sector 315. If it is desired to print a score in the eighth frame, the signals on leads F8–F1 will remain the same. Let us assume that the score is 210. In order to initiate score printing, and assuming that the hundreds digit is printed first, lead FP1 will have an OFF signal thereon, while lead FP2 has an ON signal thereon. This will stop the printing wheel at sector 315 in FIG. 15; and after the hundreds digit (2) is printed, the signals on leads FP1 and FP2 will reverse to position the sector 313 in alignment with lamps FL–8 through FPL–1 where the printing wheel prints the tens digit (1) in the score. Finally, OFF signals will appear on both leads FP–1 and FP–2 to position the printing wheel preparatory to printing units (0) in the score. The action involved in printing the three digits occur very rapidly—in a matter of a few seconds.

As will be appreciated, the foregoing procedure for printing scores could be reversed if desired, with units being printed first, tens second and hundreds third.

Referring now to FIGS. 17, 18 and 19, another embodiment of the invention is shown wherein elements corresponding to those shown in FIGS. 1 and 3 are identified by identical reference numerals. It will be noted that in the case of FIG. 17, the transparent plates 22 and 24 are not provided with a clamping mechanism. Rather, lines defining a blank score sheet form are scribed on the underside of the transparent plates 22 and 24 and the printed numerals are printed directly on top of the transparent plates where they may be projected via the assembly 38 and thereafter wiped off at the completion of a game. The essential difference between the embodiment shown in FIGS. 17 and 18 and that shown in FIG. 1 is that it includes a second cantilever arm 12′ and second printing wheel 10′ adapted to print on a permanent score sheet form 310 carried on the table 46 and clamped thereto by means of a clamping mechanism 48′ identical in construction to the clamping mechanism 48 shown in FIG. 1. The score sheet form 310 will hereinafter be described in detail in connection with FIG. 19; however, in one important respect, it differs from that shown in FIG. 1 in that light does not pass through it, the projection being by way of the transparent plates 22 and 24.

With specific reference to FIG. 18, it will be noted that the mechanism is essentially the same as that shown in FIG. 3. with the exception that the open-ended housing 82 has been lengthened and the spacing between the brackets 78 and 76 increased with a consequent increase in the length of the carriage 74. The stroke of the carriage along the rods 70 and 72, however, is the same as that shown in FIG. 3. At the end of the open-ended housing 82 opposite the cantilever arm 12 is the second cantilever arm 12′ mounted in the identical manner, but without an inked tape. Interconnecting the drive shaft 204 on the arm 12 and drive shaft 204′ on the arm 12′ is a shaft 312, the arrangement being such that shaft 204′ is slaved or synchronized with shaft 204 whereby at any instant both printing wheels 10 and 10′ will have the identical printing characters at their lowermost positions preparatory to printing.

The operation for the cantilever arm 12 and printing wheel 10 in the embodiment of FIG. 17 is identical to that described above in connection with FIGS. 1 and 3; while the operation of the cantilever arm 12′ and printing wheel 10′ is identical to that of elements 10 and 12. Thus, during a printing operation both print wheels 10 and 10′ are pressed against a transparent plate and the score sheet 310 respectively.

With reference to FIG. 19, the score sheet 310 is shown and comprises an upper translucent sheet 314 superimposed on carbon paper 316. The carbon paper 316 has carbon on both sides thereof such that when a type impression is made on the upper translucent sheet 314, carbon will be transferred to the underside of sheet 314 as well as an opaque sheet 319 beneath carbon paper 316. Beneath sheet 318 are as many alternate layers of carbon paper and opaque score sheets as is desired, preferably one score sheet for each player in a game which he can keep as a permanent record. The translucent sheet 314 enables the score to be viewed as they are printed, as will be understood. It will be appreciated that an inked tape or the like is not required in the case of printing wheel 10′ since all printed characters, including those on the top translucent sheet 314, are produced by carbon paper.

The arrangement shown in FIGS. 17–19 enables the printed scores to be projected while at the same time as many permanent records of the score sheet as are desired can be produced. This eliminates the necessity of a duplicating process as is required in the embodiment of FIG. 1 to produce permanent score sheet records.

In FIG. 20 still another embodiment of the invention is shown wherein elements corresponding to those shown in FIG. 4 are identified by like reference numerals. In this case, the score sheet 36″, similar to score sheet 36 previously described, is supported beneath a transparent plate 22′ rather than above. The score sheet 36″ is formed from non-absorbing transparent material and is guided beneath the plate 22″ by means of guideways 320 and 322 suspended from the underside of the top of console 16. It will be noted that in this embodiment of the invention, the upstanding portion 60 of console 16 and slot 14 are eliminated. The cantilever arm 12″ is essentially the same as that hereinbefore described except that it is inverted; and the brackets 76″ and 78″ and pivot point 80″ are at the rear of open-ended housing 82″ whereby the weight of the assembly will cause it to normally pivot in a clockwise direction to move arm 12″ away from score sheet 36″. In order to move arm 12″ upwardly to press printing wheel 10″ against the score sheet, the portion 90″ of a lever arrangement, similar to lever 86 of FIG. 3, is employed to selectively move arm 12″ upwardly during a printing sequence.

In operation, the score sheet 36″ will be initially guided along guideways 320 and 322 and clamped in position by means of a clamp, not shown. This clamp may, for example, take the form of a plate suspended beneath center strip 51 shown in FIG. 2 and deciprocable between a lower position where it permits the score sheet to pass thereover and an upper position where it snugly abuts the score sheet to hold it in place. The sheet 36″ may have the blank outline of a conventional bowling game score sheet scribed thereon, or the score sheet itself may be blank with the form scribed on plate 22″. In either case, the sequence of operations is the same as that described above in connection with the preceding embodiments.

If desired, the arrangement of FIG. 20 may be mechanically coupled to a second cantilever arm as in FIG. 18 to simultaneously produce permanent copies of the score sheet.

Although the invention has been shown in connection with certain specific embodiments, it will be readily apparent to those skilled in the art that varies changes in form and arrangement of parts may be made to suit requirements without departing from the spirit and scope of the invention.

We claim as our invention:

1. In apparatus for printing the score on a bowling game score sheet so as to maintain a substantially continuous image of the score sheet during the progress of a bowling game, the combination of carriage means positioned beyond the edge of the score sheet and movable in a plane extending parallel to the score sheet, a cantilever arm mounted on said carriage means and projecting outwardly therefrom over the score sheet, printing means carried on said cantilever arm, said printing means having a single band of type characters thereon which are rotatable about an axis extending perpendicular to the cantilever arm and which are successively movable into position to be momentarily pressed against the score sheet, means for selectively moving said cantilever arm toward the score sheet to thereby press a type character against the score sheet, and means responsive to electrical intelligence representing a score having a plurality of digits therein for actuating said printing means and cantilever arm to print successive digits of the score by successive momentary depressions of a type character with the cantilever arm moving laterally to the position of a next digit after each digit is printed.

2. In apparatus for printing the score on a bowling game score sheet so as to maintain a substantially continuous image of the score sheet during the progress of a game, the combination of a bowling game score sheet a game, divided into player lines and ten frame columns extending perpendicular to the player lines, carriage means positioned beyond the edge of the score sheet adjacent the tenth frame column thereon and movable in a plane extending parallel to the score sheet, a cantilever arm mounted on said carriage means and projecting outwardly therefrom over the score sheet, the cantilever arm extending parallel to said player lines, printing means carried on said cantilever arm, said printing means having a single band of type characters thereon which are rotatable about an axis extending perpendicular to the cantilever arm and which are successively movable into position to be momentarily pressed against the score sheet, means for selectively moving said cantilever arm toward the score sheet to thereby press a type character against the score sheet, and means responsive to electrical intelligence representing a score having a plurality of digits therein for actuating said printing means and cantilever arm to print successive digits of the score by successive momentary depressions of a type character with the cantilever arm moving laterally to the position of a next digit after each digit is printed.

3. In apparatus for printing the score on a bowling game score sheet so as to maintain a substantially continuous image of the score sheet during the progress of a bowling game, the combination of a horizontal substantially transparent supporting plate, means supporting the score sheet beneath said plate in close abutting relationship thereto, carriage means positioned beyond the edge of the score sheet and movable in a plane extending parallel to the score sheet, a cantilever arm mounted on said carriage means and projecting outwardly therefrom beneath the score sheet, printing means carried on said cantilever arm, said printing means having a single band of type characters thereon which are rotatable about an axis perpendicular to the cantilever arm and which are successively movable into position to be momentarily pressed against the score sheet, means for selectively moving said cantilever arm toward the score sheet to thereby press a type character against the score sheet, and means responsive to electrical intelligence representing a score having a plurality of digits therein for actuating said printing means and cantilever arm to print successive digits of the score by successive momentary depressions of a type character with the cantilever arm moving laterally to the position of a next digit after each digit is printed.

4. In apparatus for printing the score on a bowling game score sheet so as to maintain a substantially continuous image of the score sheet during the progress of a bowling game, the combination of carriage means positioned beyond the edge of the score sheet and movable in a plane extending parallel to the score sheet, a support member mounted on said carriage means and pivotal about an axis extending parallel to the score sheet, a cantilever arm mounted on said support member and projecting outwardly therefrom over the score sheet, printing means carried on said cantilever arm, said printing means having a single band of type characters thereon which are rotatable about an axis extending perpendicular to the cantilever arm and which are successively movable into position to be momentarily pressed against the score sheet, means for selectively rotating said support member and the cantilever arm carried thereby about said pivotal axis to thereby press a type character against the score sheet, and means responsive to electrical intelligence representing a score having a plurality of digits therein for actuating said printing means and cantilever arm to print successive digits of the score by successive mometary depressions of a type character with the cantilever arm moving laterally to the position of a next digit after each digit is printed.

5. In apparatus for printing the score on a bowling game score sheet so as to maintain a substantially continuous image of the score sheet during the progress of a bowling game, the combination of carriage means positioned beyond the edge of the score sheet and movable in a plane extending parallel to the score sheet in a first direction which extends parallel to the player lines on the score sheet and in a second direction which is parallel to the frame columns on the score sheet, a support member mounted on said carriage means for pivotal movement about an axis extending parallel to the frame columns on said score sheet, a cantilever arm mounted on said support member and projecting outwardly therefrom over the score sheet and parallel to the player lines thereon, printing means carried on said cantilever arm, said printing means having a single band of type characters thereon which are rotatable about an axis extending perpendicular to the cantilever arm and which are successively movable in a plane extending parallel to said player lines into position to be momentarily pressed against the score sheet, means for selectively pivoting said support member and the cantilever arm carried thereby to move the cantilever arm toward the score sheet whereby a type character on the printing means is pressed against the score sheet, and means responsive to electrical intelligence representing a score having a plurality of digits therein for actuating said printing means and cantilever arm to print successive digits of the score by successive momentary depressions of a type character with the cantilever arm moving laterally to the position of a next digit after each digit is printed.

6. In apparatus for printing the score on a bowling game score sheet so as to maintain a substantially continuous image of the score sheet during the progress of a bowling game, the combination of carriage means positioned beyond the edge of the score sheet and movable in a plane extending parallel to the score sheet, a support member pivotally mounted on said carriage means about an exis extending parallel to said score sheet, a cantilever arm mounted on said support member and projecting outwardly therefrom over the score sheet, printing means carried on said support member, said printing means having a single band of type characters, thereon which are rotatable about an axis extending perpendicular to the cantilever arm and which are successively movable into position to be momentarily pressed against the score sheet, drive means on said support member for moving said single band of type characters, means for selectively pivoting said support member and the cantilever arm carried thereby about said pivotal axis whereby the cantilever arm will be moved toward the score sheet to press a type character against the score sheet, and means responsive to electrical intelligence representing a score having a plurality of digits therein for actuating said printing means and cantilever arm to print successive digits of the score by successive momentary depressions of a type character with the cantilever arm moving laterally to the position of a next digit after each digit is printed.

7. In apparatus for printing the score on a bowling game score sheet so as to maintain a substantially continuous image of the score sheet during the progress of a bowling game, the combination of carriage means positioned beyond the edge of the score sheet and movable in a plane extending parallel to the score sheet, a cantilever arm mounted on said carriage means and projecting outwardly therefrom over the score sheet, a single printing wheel carried on the end of said cantilever arm and rotatable about an axis extending parallel to the score sheet and perpendicular to the cantilever arm, type characters circumferentially spaced around the periphery of said type wheel, means for selectively positioning a predetermined one of said type characters at the bottom of the printing wheel preparatory to a printing operation, and means for selectively moving the cantilever arm toward the score sheet to thereby momentarily press the type character on the bottom of the printing wheel against the score sheet, and means responsive to electrical intelligence representing a score having a plurality of digits therein for actuating said printing means and cantilever arm to print successive digits of the score by successive momentary depressions of a type character with the cantilever arm moving laterally to the position of a next digit after each digit is printed.

8. In apparatus for printing the score on a bowling game score sheet so as to maintain a substantially continuous image of the score sheet during the progress of a bowling game, the combination of carriage means positioned to the side of the score sheet and movable in a plane extending parallel to the score sheet, a support member pivotally mounted on said carriage means about an axis extending parallel to the frame columns on the score sheet, a cantilever arm mounted on said support member and projecting outwardly therefrom over the score sheet, said cantilever arm extending parallel to the player lines on the score sheet, a single printing wheel carried on the end of said cantilever arm and rotatable about an axis extending parallel to the frame columns on the score sheet and perpendicular to the cantilever arm, the printing characters circumferentially spaced around the periphery of said printing wheel and arranged to be read from top to bottom along the axis of the printing wheel, means for selectively pivoting said support member and the cantilever arm carried thereby about said pivotal axis to move the cantilever arm toward the score sheet and momentarily press a type character at the bottom of the printing wheel against the score sheet, and means responsive to electrical intelligence representing a score having a plurality of digits therein for actuating said printing means and cantilever arm to print successive digits of the score by successive momentary depressions of a type character with the cantilever arm moving laterally to the position of a next digit after each digit is printed.

9. The apparatus of claim 8 and including motor means on said support member for driving said printing wheel, drive shaft means operatively connected to said motor means and extending parallel to said cantilever arm at one side thereof, and bevel gear means connecting the forward end of said drive shaft means to the printing wheel.

10. In apparatus for printing the score on a bowling game score sheet so as to maintain a substantially continuous image of the score sheet during the progress of a bowling game, the combination of carriage means positioned to the side of the score sheet and movable in a plane extending parallel to the score sheet, a support member pivotally mounted on said carriage means about an axis extending parallel to said score sheet, a cantilever arm mounted on said support member and projecting outwardly therefrom over the score sheet, printing means carried on said cantilever arm, said printing means comprising a continuous band movable around a closed path to conform to the shape of said cantilever arm, said continuous band having type characters spaced along its length, means for moving said band along its closed path of travel whereby successive ones of the type characters thereon may be moved into position to be momentarily pressed against the score sheet, means for selectively pivoting said support member about its pivotal axis to move said cantilever arm toward the score sheet to thereby press a type character against the score sheet, and means responsive to electrical intelligence representing a score having a plurality of digits therein for actuating said printing means and cantilever arm to print successive digits of the score by successive momentary depressions of a type character with the cantilever arm moving laterally to the position of a next digit after each digit is printed.

11. In apparatus for positioning a member at any one of a plurality of positions along a path of travel, the combination of a plurality of light sources, a plurality of photoelectric devices each of which is responsive to light from an associated one of said light sources, code means connected to said member so as to move therewith and interposed between said light sources and the photoelectric devices, said code means being divided into a plurality of areas which are successively movable into position between the photoelectric devices and the light sources such that when any area is between the photoelectric devices and the light sources the member will be at an associated one of said positions, each of said areas having portions which are opaque and portions which are light transmitting whereby light from the light sources will fall upon selected ones of the photocells definitive of a preselected one of the positions of said member, means for producing electrical signals which match those produced by the photocells at a desired position of the member, and apparatus for moving said member until the electrical signals produced by said last-named means match those produced by the photocells.

12. In apparatus for positioning a member at any one of a plurality of positions along a path of travel, the combination of a code disc divided into annular portions, part of each annular portion being opaque and part being transparent, a plurality of light sources on one side of said code disc each of which is radially spaced from the center of the code disc so as to direct light onto an associated one of said annular portions, a plurality of photocells on the other side of the code disc each of which is radially spaced from the center of the code disc so as to be adjacent an associated one of the annular portions and responsive to light from the light source directed against its associated annular portion when a transparent part thereof is interposed between the light source and photocell, means mechanically connecting the code disc to said member such that the code disc will rotate as the member moves along said path of travel, the arrangement of the transmitting and opaque parts of the annular portions on the code disc being such that at each position of the member a predetermined combination of the photocells will be exposed to light from their associated light sources whereby the photocells will produce a first combination of signals indicative of that particular position, means for producing a second combination of signals indicative of a desired position of the member, means for comparing said first and second combinations of the signals, and apparatus for producing movement in said member until the first and second combinations of signals match each other.

13. In apparatus for printing bowling game scores on a score sheet and including a printing member movable parallel to the frame columns of the score sheet and adapted to be stopped at either a ball results box or score box in a frame box of any player line; the combination of a carriage on which said printing member is mounted, means for moving said carriage and the printing member carried thereby along a path of travel which is transverse to the player lines on the score sheet, a code disc mechanically connected to said carriage whereby movement of the carriage and the printing member along their path of travel will cause rotation of the code disc, said code disc being divided into radially spaced annular portions, part of said annular portions being opaque and part being transparent, a plurality of light sources on one side of said code disc each of which is radially spaced from the center of the code disc so as to direct light on an associated one of said annular portions, a plurality of photocells on the other side of the code disc each of which is radially spaced from the center of the code disc so as to be adjacent an associated one of the annular portions and responsive to light from the light source directed against its associated annular portion when a transparent part thereof is interposed between the light source and photocell, the transparent and opaque parts of some of said annular portions being such as to cause different combinations of photocells to be exposed to light from the light sources as the printing member moves from one player line to the next, the arrangement of the transparent and opaque parts of the remaining annular portions being such as to cause in each player line a first combination of exposed and unexposed photocells when the printing member is over a results box and a second combination when the printing member is over the score space of a frame box, circuit means for producing a combination of signals which match those produced by the photocells at a preselected player line and result box or score space within the player line, and means for comparing the signals produced by said photocells and said circuit means and for causing movement of said carriage and printing member as well as said code disc until signals produced by the photocells match those produced by the circuit means.

14. The apparatus of claim 13 wherein the light sources are continuously energized, wherein said combinations of photocells exposed to light at any location of the printing member define a binary code, and wherein said comparing means comprises a binary comparator.

15. In apparatus for printing bowling game scores on a score sheet and including a printing member movable along the player lines of the score sheet and adapted to be stopped at any frame column along any player line; the combination of a carriage on which said printing member is mounted, means for moving said carriage and the printing member carried thereby along a path of travel extending parallel to the player lines on the score sheet, a code disc mechanically connected to said carriage whereby movement of the carriage and the printing member along a path of travel will cause rotation of the code disc, said code disc being divided into radially spaced annular portions, part of said annular portions being opaque and part being transparent, a plurality of light sources on one side of said code disc each of which is radially spaced from the center of the code disc so as to direct light on an associated one of said annular portions, a plurality of photocells on the other side of the code disc each of which is radially spaced from the center of the code disc so as to be adjacent an associated one of the annular portions and responsive to light from the light source directed against its associated annular portion when a transparent part thereof is interposed between the light source and photocell, the transparent opaque parts of some of said annular portions being such as to cause different combinations of photocells to be exposed to light from the light sources as the printing member moves from one frame column to the next, the arrangement of the transparent opaque parts of the remaining annular portions being such as to cause in each frame column a first combination of exposed and unexposed photocells when the printing member is over a first position in the frame column, a second combination when the printing member is over a second position in the frame column and a third combination when the printing member is over a third position in the frame column, circuit means for producing a combination of signals which match those produced by the photocells at a preselected frame column and position within that frame column, and means for comparing the signals produced by said photocells and said circuit means and for causing movement of said carriage and printing member as well as said code disc until signals produced by the photocells match those produced by the circuit means.

16. The apparatus of claim 15 wherein the light sources are continuously energized, and wherein the first, second and third positions at which the printing member is stopped within a frame column correspond to the units, tens and hundreds positions of a score printed in a frame.

17. In apparatus for printing bowling game scores on a bowling game score sheet; the combination of carriage means movable in a plane extending parallel to the score sheet, printing means carried on said carriage means, said printing means having a single band of type characters thereon which are successively movable into position to be momentarily pressed against the score sheet, means for selectively moving the printing means toward the score sheet to thereby press a type character against the score sheet, and means responsive to electrical intelligence representing a score having a plurality of digits therein for actuating said printing means and said carriage means to print successive digits of the score by successive momentary depressions of the type characters with the carriage means moving laterally to the position of a next digit after each digit is printed.

18. In apparatus for printing scores on transparent bowling game score sheet means while simultaneously printing the scores upon a paper score sheet form usable as a permanent record; the combination of means for positioning the transparent score sheet means and paper score sheet means in side-by-side relationship in a common plane, carriage means positioned adjacent the edges of the transparent and paper score sheet means and movable in a plane extending parallel to said first-mentioned plane, a pair of cantilever arms mounted on said carriage means and projecting outwardly therefrom over the transparent score sheet means and paper score sheet means respectively, printing means carried on each of said cantilever arms, each of said printing means having type characters thereon which are successively movable into position to be pressed against an associated one of the score sheet means, means for simultaneously moving the type characters on both printing means whereby the type characters on each printing means in position to be pressed against an associated score sheet means will always be the same, means for selectively and simultaneously moving both of said cantilever arms toward their respective score sheet means to thereby press type characters against both score sheet means, and means positioned beneath the transparent score sheet means for directing light through the transparent score sheet means and for focusing the light passing through the transparent score sheet means onto a screen such that a substantially continuous and unobstructed image of the entire transparent score sheet means can be viewed on the screen during the progress of a bowling game while the entire paper score sheet means will also be substantially unobstructed for viewing during the progress of a bowling game.

19. The combination of claim 18 in which transparent score sheet means presents a non-absorbing surface against which said type characters are pressed, and including a source of ink adapted to be impressed by the type characters upon the transparent score sheet means to effect printed characters thereon, said source of ink being such that it will remain moist on the non-absorbing surface of the transparent score sheet means whereby it may be wiped off at the completion of a game and the transparent score sheet means used for a subsequent bowling game.

References Cited by the Examiner
UNITED STATES PATENTS

| | | | |
|---|---|---|---|
| 1,361,226 | 12/1920 | Bumgardner | 101—90 X |
| 1,911,690 | 5/1933 | Howard | 101—90 |
| 1,950,373 | 3/1934 | Defenbrock | 101—407 |
| 2,019,442 | 10/1935 | Buehler | 101—90 X |
| 2,307,108 | 1/1943 | Bryce | 101—93 |
| 2,330,799 | 10/1943 | Coker et al. | 88—24 |
| 2,846,043 | 8/1958 | Hickerson | 197—55 |
| 3,124,355 | 10/1963 | Mentzer et al. | 101—407 |
| 3,168,182 | 2/1965 | Bernard et al. | 197—55 |

WILLIAM B. PENN, *Primary Examiner.*